United States Patent [19]
Marth et al.

[11] Patent Number: 5,713,072
[45] Date of Patent: Jan. 27, 1998

[54] CELLULAR FRAUD DETERRENT SYSTEM

[76] Inventors: Charles Marth, 2400 Northwest 100th Ave., Coral Springs, Fla. 33065; Kenneth D. Wruk, 1153 Johnson Apt. No. 3015, Buffalo Grove, Ill. 60089; Kurt T. Lemke, 393 W. Hamilton Dr., Palatine, Ill. 60067; Zhu Shenzhong, 1320 S. Elmhurst Rd. Apt. 304, Mt. Prospect, Ill. 60056

[21] Appl. No.: 526,899

[22] Filed: Sep. 12, 1995

[51] Int. Cl.$^6$ .................... H04Q 7/00; H04Q 9/00
[52] U.S. Cl. .................... 455/33.1; 455/54.1; 455/56.1; 455/54.2; 455/67.1
[58] Field of Search .................... 455/33.1, 54.1, 455/56.1, 54.2, 67.1; 379/58, 59, 60, 62; 340/825.3, 825.31, 825.34; 380/21, 23

[56] References Cited

U.S. PATENT DOCUMENTS

| | | | |
|---|---|---|---|
| 5,008,953 | 4/1991 | Dahlin et al. | 455/54.1 |
| 5,239,680 | 8/1993 | Grube et al. | 455/54.2 |
| 5,335,278 | 8/1994 | Matchett et al. | 455/54.1 |
| 5,337,345 | 8/1994 | Cassidy et al. | 455/54.2 |
| 5,437,053 | 7/1995 | Sawa et al. | 455/54.1 |
| 5,448,760 | 9/1995 | Frederick | 455/56.1 |

*Primary Examiner*—Reinhard J. Eisenzopf
*Assistant Examiner*—Marsha D. Banks-Harold
*Attorney, Agent, or Firm*—Augustus G. Douvas

[57] ABSTRACT

A system for deterring fraudulent cloning by a reader station of valid call-origination message parameters assigned to authorized mobile radiotelephone stations operating within a cell or other area of a cellular radiotelephone system in which valid call origination messages are initiated between the mobile stations and a fixed cell-site radiotransceiver station for that cell or area. A database containing a plurality of valid call-origination message parameter combinations assigned to the authorized mobile stations is established in the radiotelephone system. An auxiliary fraud-deterrent transmitter station transmits call origination messages containing invalid parameters in such cell or area the cellular radiotelephone system. These invalid parameters are not verifiable at the database. The reader station receives both the valid and invalid call origination messages with an inability to discern with certainty between the valid and the invalid call origination messages.

32 Claims, 30 Drawing Sheets

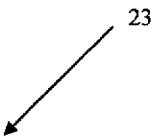

| MESSAGE CLASS TYPES - ORDER AND ORDER QUALIFICATION CODES | | |
|---|---|---|
| ORDER CODE | ORDER QUALIFICATION CODE | FUNCTION |
| 00000 | 000 | CALL ORIGINATION |
| 00001 | 000 | ALERT |
| 00011 | 000 | RELEASE |
| 00100 | 000 | REORDER |
| 00110 | 000 | STOP ALERT |
| 00111 | 000 | AUDIT |
| 01000 | 000 | SEND CALLED-ADDRESS |
| 01001 | 000 | INTERCEPT |
| 01010 | 000 | MAINTENANCE |
| 01011 | 000 | CHANGE POWER TO LEVEL 0 |
| 01011 | 001 | CHANGE POWER TO LEVEL 1 |
| 01011 | 010 | CHANGE POWER TO LEVEL 2 |
| 01011 | 011 | CHANGE POWER TO LEVEL 3 |
| 01011 | 100 | CHANGE POWER TO LEVEL 4 |
| 01011 | 101 | CHANGE POWER TO LEVEL 5 |
| 01011 | 110 | CHANGE POWER TO LEVEL 6 |
| 01011 | 111 | CHANGE POWER TO LEVEL 7 |
| 01100 | 000 | DIRECTED RETRY-NOT LAST TRY |
| 01100 | 001 | DIRECTED RETRY-LAST TRY |
| 01101 | 010 | AUTONOMOUS REGISTRATION-DO NOT MAKE WHEREABOUTS KNOWN |
| 01101 | 011 | AUTONOMOUS REGISTRATION-MAKE WHEREABOUTS KNOWN |
| 11110 | 000 | LOCAL CONTROL |

Fig. 8

| MESSAGE CLASS TYPES - LOCAL CONTROL CODES ||||
|---|---|---|---|
| ORDER CODE | ORDER QUALIFICATION CODE | LOCAL CONTROL CODE | FUNCTION |
| 11110 | 000 | 00001 | ABBREVIATED INTERCEPT |
| 11110 | 000 | 00010 | ABBREVIATED REORDER |
| 11110 | 000 | 00101 | ABBREVIATED ALERT |

Fig. 9

CELLULAR FRAUD DETERRENT SYSTEM

This invention relates to systems for deterring fraudulent cloning of valid communication signal parameters which identify mobile, portable and transportable radiotelephone stations authorized to operate within a cellular radiotelephone system.

BACKGROUND OF THE INVENTION

Cloning, that is stealing cellular Mobile Identification Numbers (MINs) and Electronic Serial Numbers (ESNs) assigned to validated mobile, portable and transportable (hereinafter collectively termed "mobile") radiotelephone stations and fraudulently using these same numbers to program unauthorized stations to avoid paying for air time and other fees is a major concern of the cellular industry. It is estimated that this industry is growing at a rate of approximately 25,000 to 30,000 new customers every day, and that it is losing approximately 5 to 30 percent of its annual revenues to fraud. Most of this loss is traced directly to cloning.

Initially, Los Angeles, Miami and New York were the prime problem areas, but now fraudulent cloning has extended into almost every area of the United States. This form of cellular theft is providing free and virtually untraceable communications for gangs, drug traffickers, and international terrorists. As a result many authorized cellular radiotelephone customers receive incredulously high monthly bills with page after page of charges, sometimes in the hundred or even thousands of dollars for calls they never made.

The cellular "thieves" have in the past developed many methods for stealing air time, which is the principal commodity sold by the cellular industry.

The earliest scam was known as "tumbling fraud," which involved the use of fake numbers that weren't detected by early verification systems until calls had been completed. When computer validation of signals became more sophisticated, tumbling no longer worked and cloning was born. The cellular thieves could no longer make up numbers; real numbers were necessary. The numbers the thieves needed were a mobile telephone's Electronic Serial Number (ESN), which is installed by a manufacturer and cannot be altered, and the Mobile Identification Number (MIN) which is the telephone number of the mobile station. These two numbers were required to signal a cellular network's computers that a valid call had been originated and that the necessary cellular communication links should be established.

In the early years of the cellular industry, the (MIN) and (ESN) numbers were acquired by cellular thieves by purchase from unethical dealers or employees. Increased internal security reduced this form of theft.

Currently, the theft is more frequently accomplished by a device called an electronic serial-numbers reader, known as an (ESN) reader. The reader "reads" the valid cellular call-origination signals as they are transmitted on a cellular system reverse control channel (RECC) by the mobile station.

When a mobile cellular phone is activated, and then roughly every 15 minutes thereafter, the phone transmits the (MIN-ESN) number combination which identifies that particular phone. This number combination is also transmitted when a subscriber's interrupted call resumes, such as when emerging from a tunnel.

With this knowledge, thieves often locate near tunnel exits or in places where validated subscribers are likely to be turning on their phones, as they often do when leaving parking garages, airports or shopping malls.

Several different concerns now offer fraud-detection systems to cellular companies. Among the most popular is software that detects changes in calling patterns, such as an increase in volume or simultaneous calls being made from different parts of the country with the same (MIN-ESN) number combination.

Other technologies concentrate on techniques that reduce the possibility of stealing numbers by placing unique identifiers in addition to (MIN) and (ESN) numbers on the signals transmitted by the validated mobile phones. These identifiers attempt to create a unique phone print that cannot be cloned. As presently advised, these phone print techniques have to date not met with commercial success because they result in unreliable phone communications with calls being terminated at undesired times.

A general review of techniques used in accomplishing cellular fraud is set forth in The Cellular Radio Handbook, third edition, published by Quantum Publishing at pages 475-482.

SUMMARY OF THE INVENTION

Accordingly, a principal object of this invention is to substantially minimize the economic loss incurred by the cellular system operators through fraud.

Another object is to reduce substantially the cloning of valid cellular call-origination message parameters for the purpose of fraudulently using these same parameters to program unauthorized cellular phones to avoid paying for air time and other fees.

Another object is to render as unreliable the attempted identification of valid call-origination message parameters by reader stations for the purpose of programming unauthorized cellular phones.

This specification describes several different embodiments of the invention including a simple basic fraud-deterrent system, a moderately complex fraud-deterrent system, and a complex fraud-deterrent system. In general, a common technique is used in all three systems regardless of its complexity, namely, the transmission of invalid combinations of (MIN-ESN) call-origination message parameters by an auxiliary transmitter station. The auxiliary transmitter station transmits a flood of different and invalid (MIN-ESN) parameter combinations within an area of the cellular system suspected of harboring reader stations whose purpose is to determine valid call-origination message parameters for the purpose of fraudulent cloning unauthorized non-subscriber phones. These fraudulently cloned phones are then used to steal air time without the payment of fees.

The invalid (MIN-ESN) parameter combinations are transmitted by the auxiliary station on the same reverse control channel frequency as are the valid combinations of (MIN-ESN) parameters for establishing call origination between authorized mobile cellular phones and the proper base or cell-site station. Because the valid and invalid (MIN-ESN) parameter combinations are transmitted on the same frequency and are interspersed and commingled timewise, the reader station receives an unreliable mixture of valid and invalid parameters which is then used for fraudulent cloning. Any phone cloned with an invalid parameter combination is incapable of originating a fraudulent cellular phone call using free air time. In many instances, ninety (90) percent of a reader-station prepared list of cloned numbers are invalid (MIN-ESN) parameter combinations when the fraud-deterrent system of this invention is employed.

Legal radiotelephone cellular communications are originated between authorized subscriber mobile stations and a fixed cell-site radiotransceiver station for that cell. In particular, these calls are in principal part originated through the use of a group of duplex control channels. Each duplex control channel comprises a reverse control frequency signal (RECC) transmitted by a mobile station to the fixed cell-site station and a forward frequency control signal (FCC) transmitted from the fixed cell-site station to the mobile station. One or more specific parameters termed Digital Color Code (DCC) is assigned to the fixed cell-site station to distinguish that station from neighboring cell-site stations. The (DCCs) are transmitted on the control channels to establish in part communication links between the mobile stations and the closest fixed cell-site station. Some cells are serviced by a cell site assigned one (DCC) and one duplex control channel. Other cells may be subdivided or sectored with each sector being serviced by a different (DCC) and a different duplex control channel for each sector.

The cellular radiotelephone system has a database of valid (MIN-ESN) number combinations. A mobile station operating within the transmitting range of the fixed cell-site station responds to the specified one (DCC) assigned to that cell-site station, or if the cell is sectored, the (DCC) assigned to the sector in which the mobile station is operating.

In order for a mobile station to establish a communication link with the fixed cell-site station, the mobile station transmits on a proper reverse control channel (RECC) a valid call origination message containing the proper (DCC) and a valid combination of (MIN-ESN) parameters assigned to the mobile station. This valid combination is verifiable by comparison with the valid (MIN-ESN) parameter combinations contained in the database of valid (MIN-ESN) combinations which is part of the cellular radiotelephone security apparatus.

According to a moderately complex version of this invention applicable to sectored cells, the auxiliary transmitter station transmits sequentially invalid call-origination messages within each sector of a cell on a different reverse control frequency channel (RECC) that is assigned to each sector of the cell. The invalid call-origination messages transmitted by the auxiliary transmitter station contain an inoperative (DCC) which is sequentially changed so as to utilize an invalid (DCC) for each sector and a random sequence of invalid (MIN-ESN) parameter combinations not verifiable at the cellular radiotelephone system by comparison with the database of valid (MIN-ESN) parameter combinations.

The reader station operated by the would-be thieves receives both the valid call origination messages transmitted by the mobile stations communicating within each sector of the fixed cell-site station, as well as a flood of invalid call-origination messages. However, the reader station is unable to distinguish between the valid and the invalid call origination messages. The clones developed by the reader station are thus unsuitable for use or sale by the cellular station thieves because reliable and valid (MIN-ESN) parameter combinations are a necessity for use in their criminal activities.

The transmission by the auxiliary station of (DDCs) not assigned to a particular cell, or the several sectors of a sectored cell, prevents loading the cell-site station with invalid call origination attempts which would reduce the capacity of the cell-site station to handle authorized calls.

In the most complex embodiment of this invention, an additional and inoperative parameter selected from a subset of call-origination call class type parameters termed Order, Order Qualification Codes, and Local Control Codes is transmitted by the auxiliary transmitter station (in addition to the invalid (MIN-ESN) parameter combination and the inoperative (DCC)) to avoid improper loading of or undesirable decoding and processing by a cell-site station which is generally located at a distance from the auxiliary transmitter station. A selectable one or more of such additional inoperative code parameters are transmitted because in complex systems having a large number of cells, certain distant cell-site stations operate using the same (DCC) and control channel as the auxiliary transmitter station and thus these distant stations would be interfered with or loaded by the transmissions of the auxiliary station were it not for the additional disabling inoperative code parameter or parameters.

Another feature of the invention relates to the frequent changing of the assigned (DCC) transmitted by a cell-site station. Present-day commonly used, inexpensive reader stations, to the best of the inventors' knowledge, do not "display" the particular (DCC) transmitted by an authorized mobile station on the reverse control channel (RECC) and the (DCC) transmitted by the cell-site station on the forward control channel (FCC). Should a reader station be developed in the future having this capability, then a relationship could be established between the operable (DCC) transmitted on the reverse control channel (RECC) and the valid (MIN-ESN) parameter combination which is readable only on the reverse control channel (RECC). While the forward control channel (FCC) transmits the correct (DCC) necessary to establish an operable call-origination message, this forward channel merely transmits a confirmation of a valid (MIN-ESN) parameter combination and not the actual number combination. Such a modified reader station would thus be able to discard the invalid (MIN-ESN) parameter combinations transmitted by the auxiliary transmitter station of this invention, because they would not have the proper relationships with the operating cell-site (DCC).

The frequent changing of the operating (DCC) used by a cell-site station from either the auxiliary transmitter station, the cell-site station, the (MTSO), or elsewhere in a cellular radiotelephone system, and at the same time changing the (DCC) transmitted by the auxiliary transmitter station to an inoperative (DCC) which is different than that transmitted by the cell-site station, would render difficult or impractical, this possible alternative fraudulent technique for ascertaining valid (MIN-ESN) parameter combinations by determining the operable (DCC) transmitted on a reverse control channel (RECC) with the valid (MIN-ESN) parameter combination readable only on the duplex-paired reverse control channel (RECC).

BRIEF DESCRIPTION OF THE DRAWINGS

In order that all of the structural and functional features for attaining the objects of the Cellular Fraud Deterrent System (CFDS) of this invention may be readily understood, detailed reference is herein made to the accompanying drawings, wherein:

FIG. 8 shows a table of call-class type parameters consisting of Order (ORDER) and Order Qualification (ORDQ) codes making-up appropriate fields of an Advanced Mobile Phone Service (AMPS) call-origination message;

FIG. 9 shows a table of call-class type parameters consisting of Order (ORDER) and Order Qualification (ORDQ) codes in combination with Local Control (LOCAL) codes making-up appropriate fields of an Advanced Mobile Phone Service (AMPS) call-origination message;

DETAILED DESCRIPTION OF THE PREFERRED EMBODIMENT

General Theory of System Operation

The invention is primarily described with reference to analog systems employing call-origination formats used in Advanced Mobile Phone Service (AMPS) systems, and also in narrow-band (AMPS) systems (NAMPS).

The following specification outlines in detail the Cellular Fraud Deterrent System (CFDS) of this invention (refer to FIG. 1 for a simple basic system) for rendering difficult the fraudulent copying by an illegal reader station (RS) of certain valid cellular-phone-call origination-message parameters, namely, Mobile Identification Number (MIN) and Electronic Serial Number (ESN). These particular valid parameters are communicated between authorized-subscriber mobile stations, such as, (MS) and fixed cell-site radio-transceiver stations, such as, (CS) to establish authorized fee-paying calls. However, these valid parameters are frequently copied by a criminal element and installed in an unauthorized non-subscriber phone (FS) for the purpose of stealing free cellular air time to effect criminal or other unauthorized activities.

In general, a database containing a complete listing of valid (MIN-ESN) call-origination-message parameters assigned to legal and authorized subscriber stations is located within, or accessible to the cellular system, from several possible physical locations discussed in detail in a later section of this specification.

A principal feature of this invention comprises an auxiliary fraud-deterrent transmitter station (AUXS) which transmits invalid call-origination messages containing invalid parameters within the cellular system. These invalid message parameters are not verifiable by comparison with the database of valid (MIN-ESN) call-origination-message parameters (and also in the more sophisticated (CFDSs) other parameters termed Digital Color Code (DCC) and message class types (ORDER, ORDQ, and LOCAL codes) necessary to establish a communications link between an authorized-subscriber mobile station and a cell site.

The (RS) receives a mixture of both valid and invalid call-origination-message parameters; and because the (RS) has no capability to discern with certainty between the valid and the invalid call-origination-message parameters, the illegally acquired parameter mixture of valid and invalid parameters, is generally unacceptable to the criminal element which purchases or otherwise acquires the questionable list of call-origination-message parameters. This list is purchased by the criminal element for the purpose of stealing free cellular air time using an unauthorized non-subscriber cellular phone (FS) whose location is difficult, if not impossible to locate.

Description of a Simple Basic Cellular Fraud Deterrent System

Figure 1:
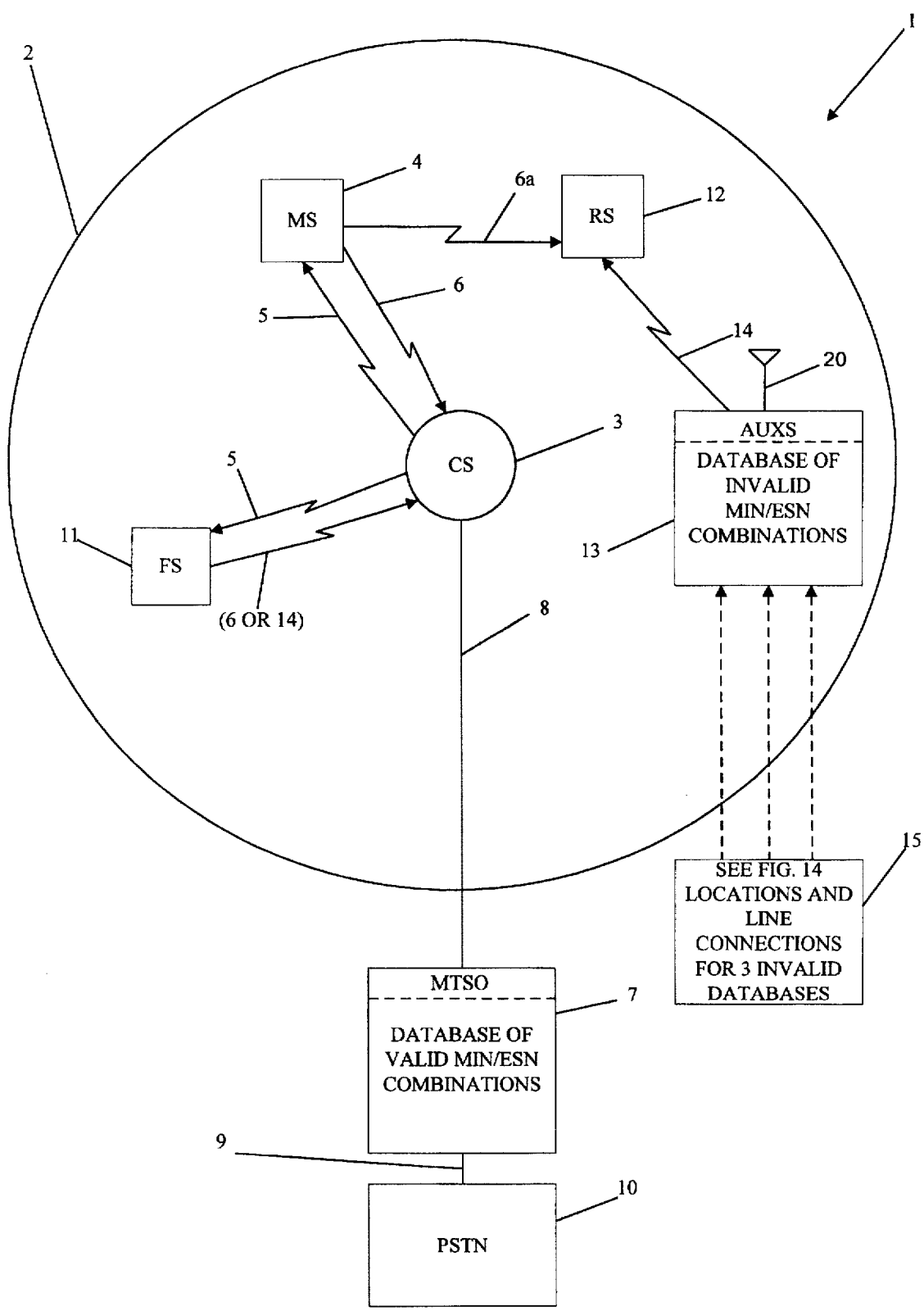
FIG. 1 illustrates a simplified diagram of a single cell-site portion of a cellular communications system in which a (CFDS) is deployed, and the basic components necessary to demonstrate the operation of the (CFDS) are included.

An illustration of a simple and basic cellular system 1 which comprises a single circular geographic cell 2 that uses a simplified version of the (CFDS) of this invention is shown in FIG. 1. Cell 2 is serviced by a centrally located fixed cell-site radio-transceiver station (CS) 3. (CS) 3 is shown communicating with a single authorized-subscriber mobile cellular phone (MS) 4 within a time period during which forward control channel FCC 5 and reverse control channel RECC 6 are utilized to establish a legal communications link between (CS) 3 and (MS) 4.

(CS) 2 is linked by a wired trunk and data line network 8 to Mobile Telephone Switching Office (MTSO) 7. (MTSO) 7 is in turn linked by a wired trunk and data line network 9 to Public Switched Telephone Network (PSTN) 10. (MTSO) 7 serves as the central coordinating center for the basic single-cell system 1 shown; and as is well known in the art, system 1 interfaces with a land telephone network through (PSTN) 10. (MTSO) 7 provides mobile cellular customers with services that are similar to those that are available to land telephone communications. An (MTSO) usually serves a large geographic coverage area, and all cellular mobile calls are switched through the (MTSO).

Cellular communications fraud techniques are employed for stealing free air-time for use by unauthorized non-subscriber phone (FS) 11 to cause it to function precisely as legitimate subscriber cellular phone (MS) 4. Because phone (MS) 4 is assigned to a paying phone customer, call usage for both such identically functional cellular phones (MS) 4 and (FS) 11 are billed to the account chargeable to the legitimate customer subscriber for (MS) 4.

The modification of a non-subscriber cellular phone (FS) 11 to mimic the operation of legitimate cellular phone (MS) 4 is known as "cloning." The process of cloning begins by obtaining at least two specific cellular-phone communication parameters necessary to identify an authorized subscriber (MS) phone, such as, (MS) 4. These parameters are the Mobile Identification Number (MIN) in combination with an Electronic Serial Number (ESN) assigned to the legitimate (MS) phone; (MIN) is the phone number for the (MS) phone and the (ESN) number is an identifying number dedicated to a specific cellular phone by the manufacturer and cannot be altered. The (MIN) and (ESN) numbers are required to signal a cellular network that a valid call-origination request is underway and that the necessary call communication links should be established through a single duplex pair of control channels when a (MS) phone is activated. Roughly every 15 minutes thereafter, the (MS) phone transmits the (MIN) and (ESN) parameter combination which identifies that particular (MS) phone. Currently, the theft of (ESN) and (MIN) number combinations is extensively and fraudulently accomplished by (RS) 12 operated for the detection and theft of valid call-origination (MIN) and (ESN) parameters.

A database of valid (MIN-ESN) parameter combinations is usually located or associated within (MTSO) 7; however, this database could be located elsewhere in the system.

Auxiliary fraud-deterrent transmitter station (AUXS) 13, a principal feature of this invention, is either located within cell 2 or is capable of transmitting a signal into that cell. (AUXS) 13 accesses a database of invalid (MIN-ESN) parameter combinations in one of several ways (see block 15 of FIG. 1, drawing details are in FIG. 14) In general, however, invalid database parameters may be downloaded into (AUXS) 13, by (a) using a serial communications channel from a portable computer system, (b) through a channel routing from (MTSO) 7, or (c) through a modem channel from a remote central office location.

In the most simplified version of the (CFDS) of this invention shown in FIG. 1, (AUXS) 13 transmits from omni-directional antenna 20 call-origination message parameters containing (MIN) and (ESN) combinations that are invalid with respect to the part of the cellular system in which (AUXS) 13 transmits a signal.

Figure 3:
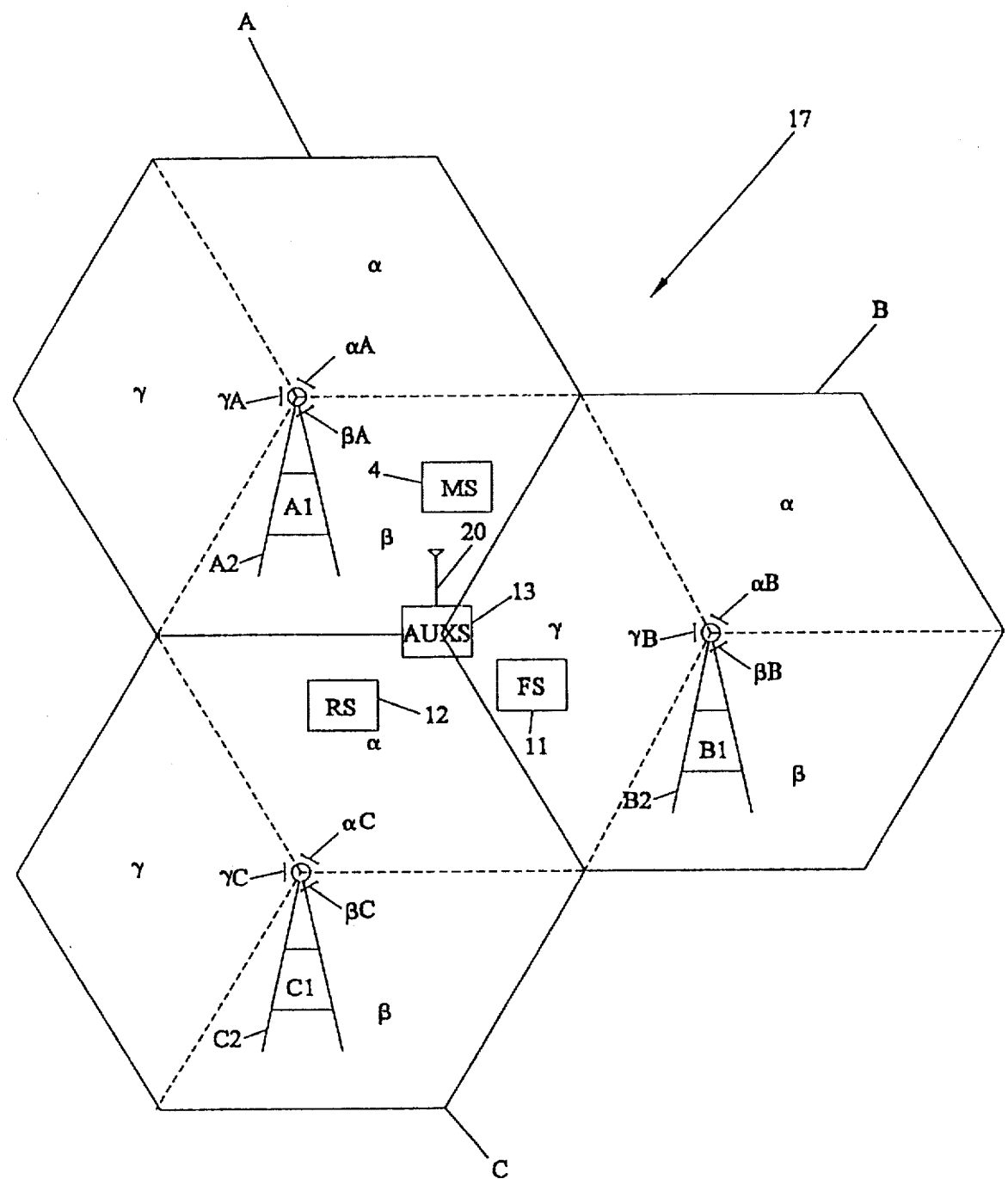
FIG. 3 shows a simplified diagram of a basic cellular coverage area which has three cell sites each of which has three cell-site faces.
Figure 5:
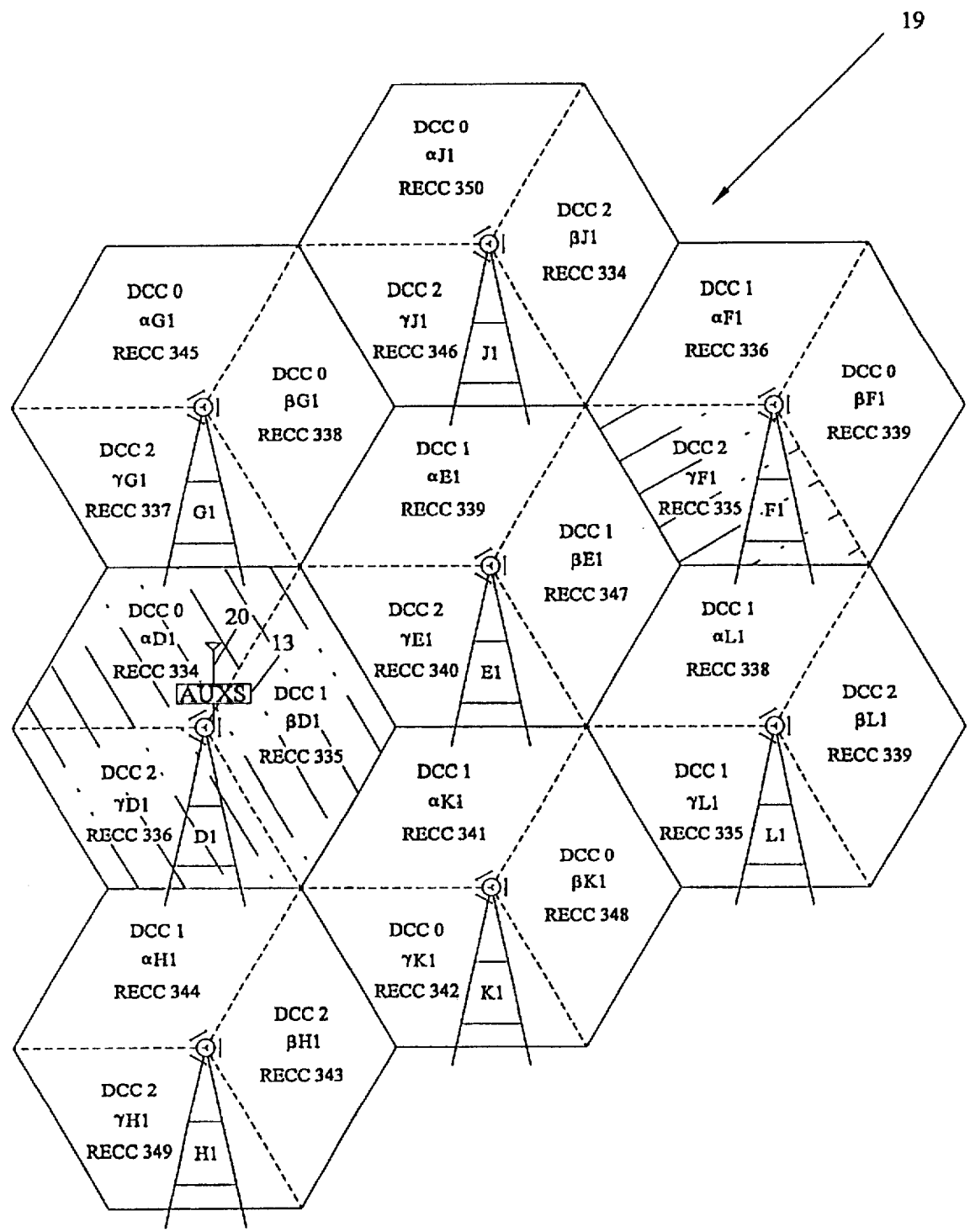
FIG. 5 shows a diagram of a series of adjacent cell sites, including relevant geographic relationships between cell faces, which illustrates selection of specific reverse control channel and Digital Color Codes as designed into a cellular-site placement plan to minimize interference.

In the more complex versions of the (CFDS) of this invention shown in FIGS. 3 and 5, (AUXS) 13 accomplishes transmission of such invalid call-origination messages in such a way so as not to interfere with the normal cell-site, radio-frequency communications traffic within the geographic area in which (AUXS) 13 is deployed through the use of additional invalid parameters. The process by which such call-origination messages do not interfere with normal cell-site communications traffic is accomplished through manipulation of digital communication parameters within each call-origination message, namely, digital parameters such as the Digital Color Code (DCC) parameters (FIG. 3 system) and other message class type parameters (ORDER, ORDQ and LOCAL codes) (FIG. 5 system) transmitted by control channels and which are also required to establish a communication link between (CS) 3 and (MS) 4.

Successful deployment of the (CFDS) invention requires two factors to hold true. First, the (CFDS) must not interfere with the normal operation of the cellular communication system within which the (CFDS) is installed. Second, the (CFDS) must effectively produce call-origination parameters, random in nature, from a database of invalid parameter combinations.

A simplified theory of (CFDS) operation is ascertainable by following the wireless transmission links shown in FIG. 1. (MS) 4 transmits a valid call-origination message containing valid parameters verifiable at the database usually associated with or located within (MTSO) 7. This valid transmission occurs on reverse control channel (RECC) 6 after an initial communication origination is effected on forward control channel (FCC) 5. Control channels 5 and 6 together form a duplex-pair separated in frequency by 45 megahertz. The valid reverse control channel (RECC) transmission is also received by (RS) 12 on wireless transmission link 6a (see FIG. 2 and the following accompanying description for the relationship of the cellular-system control channels in the United States cellular frequency band). Transmission links 6 and 6a are identical in all essential characteristics and are on the same reverse control channel frequency. However, (AUXS) 13 is also transmitting a simulated control channel signal 14 containing a variety of invalid parameters on the same frequency as that of reverse control channel (RECC) 6, and therefore, the frequency of control channel 6 also contains many combinations of invalid call-origination message parameters generated by communication link 14 and transmitted to (RS) 12 from (AUXS) 13. Accordingly, (RS) 12 receives a commingled and random mixture of different valid and invalid call-origination parameters randomly transmitted timewise through communications links 6a and 14. (RS) 12 is either unaware of or incapable of ascertaining the valid from the invalid call-origination messages. Numerically, the invalid parameter combinations should preferably greatly exceed the number valid parameter combinations.

A set of (MIN-ESN) call-origination message parameters received by (RS) 12 are thereafter coded into unauthorized non-subscriber phone (FS) 11 to avoid paying cellular phone fees and also probably to effect criminal activity using free air time. However, (FS) 11 operating on control channels 5 and 6 may very well be utilizing the invalid (MIN-ESN) call-origination parameters of communication link 14 not verifiable by comparison with the database of valid call-origination parameters, and therefore, the attempt at a non-fee call may not be completed. (FS) 11 is thus susceptible to an unreliable and uncertain communication link within cell 2. A situation that is generally intolerable to the criminal element, and which situation also greatly minimizes otherwise erroneous billing to authorized and legitimate cellular mobile phone subscribers, such as (MS) 4.

The United States Cellular System Band

Cellular systems of recent design have been greatly improved by incorporating additional system capacity by the inclusion of additional cellular channels. There are now 832 cellular channels (see FIG. 2). The use of the term "channel" may cause some confusion because each of the 832 channels actually consists of "two" channels namely, a transmit channel and a receive channel the cooperating combination of which forms a duplex pair of frequencies separated by 45 megahertz. Each duplex pair is assigned a single channel number. Thus, the term "channel" as used in cellular terminology sometimes refers to a pair of related cooperating frequencies, or alternatively to only one frequency of the pair.

The group of 832 channels is divided into 2 separate groups or subsystems of 416 channels of the duplex pair form. One group is usually termed subsystem A and the other group is usually termed subsystem B (see chart 16 of FIG. 2). Each of these two groups is operated by a different provider of cellular service in the same coverage area for competitive reasons. Additional terminology confusion is caused because each subsystem is often characterized as a cellular "system".

It should also be noted that the term "cell site" refers to a radio transceiver station serving an area of the cellular system which may be one or more cells.

Subsystem A is assigned 416 channels of the duplex form, and subsystem B is assigned the remaining 416 channels of duplex form. The 416 duplex channels of each of subsystems A and B are further subdivided into 21 control channels and 395 voice channels. These control and voice channels are all of the duplex form.

A single control channel of duplex form consists of both a forward and a reverse channel each of the single channel form. The term "reverse control channel" (RECC) refers to a single control transmission frequency from an (MS) station to the (CS) station; and the term "forward control channel" (FCC) to a single control transmission frequency from the (CS) station to the (MS) station.

Each voice and control channel duplex pair is assigned a single channel number. These channel numbers do not run consecutively from 1 to 832, but rather have the confusing channel assignment numbers set forth below:

| Subsystem A | Subsystem B |
|---|---|
| voice 1–312 | voice 355–666 |
| voice 667–716 | voice 717–799 |
| voice 991–1023 | control 334–354 |
| control 313–333 | |

Referring to FIG. 1, forward control channel (FCC) 5 and reverse control channel (RECC) 6 form a single pair of cooperating duplex channels. Channels 5 and 6 are separated by 45 megahertz.

Figure 2:
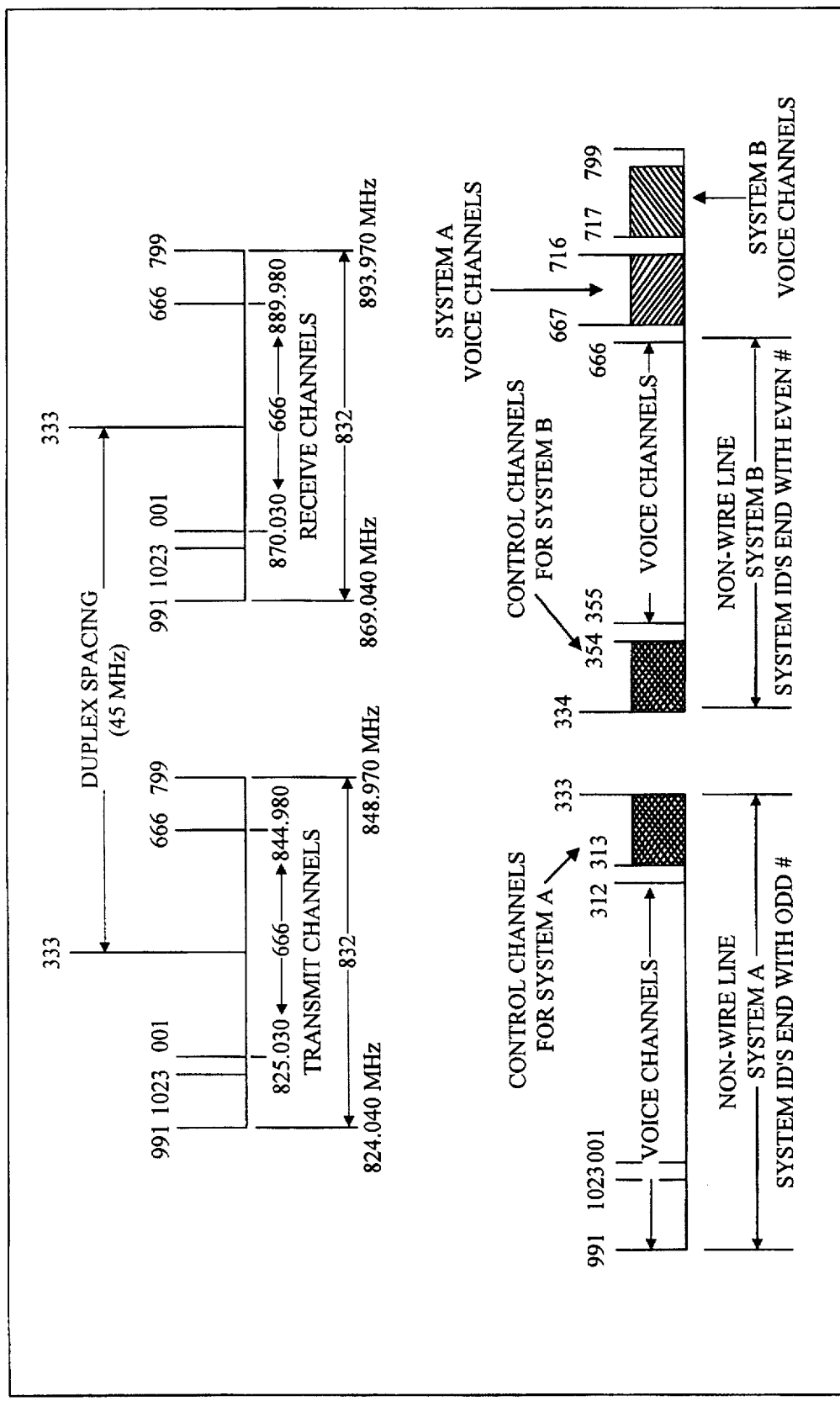
FIG. 2 shows an Advanced Mobile Phone Service (AMPS) frequency allocation chart that includes frequency duplex-spacing specifications and channel-allocation assignments designating voice channels and control channels.

The control channels are used by a cell-site radio transceiver station to remain in contact with and issue commands to the mobile phones operating in the radio transmission area when the mobile phones are not on call; and the voice channels shown in FIG. 2 are used during active calls when the mobile phones are in use. A cellular subsystem consists of many cell-site radio transceiver stations geographically located. A subsystem is subdivided into a plurality of areas called "cells" so as to always provide contact with the mobile cellular phones located in all parts of the coverage area. In general, each cell-site radio transceiver station also has a group of control and voice channels associated with it which is different than the group of channels associated with neighboring cell sites to alleviate the possibility of crosstalk. The channels associated with all of the cell sites within a subsystem represent all of the 416 channels supported by the system. It should be noted that a single control channel is a duplex pair of frequencies with each frequency separated from the other frequency of the pair by 45 megahertz. Each control-channel duplex pair constitutes a forward channel and a reverse channel. The forward channel of the duplex pair is used for carrying transmissions emanating from the cell-site radio transceiver station. The reverse control channel of the duplex pair is used for carrying transmissions emanating from the mobile stations. With reference to the cellular subsystem of FIG. 1, forward control channel 5 and reverse control channel 6 are a single duplex control channel pair which is used to establish a call communication link between (MS) 4 and (CS) 3. Each cell site has a group of control and voice channels associated with it, which is different than the group of channels assigned to neighboring cell sites in order to alleviate the possibility of crosstalk. The control channels are used by the cell site to remain in contact with and issue commands to an (MS) phone when the phone is not on call, and the voice channels are used during active calls when the phone is in use.

Call Initiation in an (AMPS) System

A simplified overview discussion of call-progress sequencing (see Cellular Mobile Telephone Equipment Specification, May 1983, issued by Advance Mobil Phone Service, Inc. for detailed structural specifications for AMPS systems and their call-origination parameters) in an analog cellular phone system known as an Advanced Mobile Phone Service (AMPS) will facilitate understanding the invention (see also *The Bell System Technical Journal*, Vol. 58, January 1979, Number 1). First, a cellular-phone mobile-station unit is registered into a cellular system through the use of digital communications messages communicated between a mobile station and a system cell-site within closest proximity to one another. Mobile-station phone registration is necessary so that the cellular system is aware of the existence of a particular identifiable cellular phone. Identification parameters unique to each mobile station cellular phone are the Mobile Phone Number (MIN) and the Electronic Serial Number (ESN) (both previously described). Once a mobile-station cellular phone is registered into a cellular system, the mobile unit may place or receive cellular phone calls.

The process of placing cellular phone calls from a mobile-station to a cell-site involves a mobile-station cellular phone sending digital communications messages known as call-origination messages using a single channel assigned to a local cell-site station from a portion of the allocated cellular radio-frequency spectrum known as the reverse control channels. Likewise, communications messages are returned to the mobile station using a single related forward control channel. The two related channels form a duplex pair separated by 45 megahertz. The first step of the registration sequence utilizes a special type of forward control channel known as a paging channel selected from a group of paging control channels. Paging channels serve as a starting point for establishing digital messaging communications after a specific control channel is selected to be used for further communications. After a communication link between a mobile station and a local cell site is complete, the mobile station is commanded by the cell site to establish communications to a different portion of the allocated cellular spectrum known as a voice channel. A voice channel is used to carry phonecall voice-transmission signals between a mobile-station cellular phone and a cell site. Voice transmission signals are ultimately switched into a public switched telephone network (PSTN) utilized by the cellular phone communications system.

The process by which a mobile-station cellular phone receives cellular phone calls involves a cell-site station transmitting a paging digital communications message using a portion of the allocated cellular radio-frequency spectrum known as forward paging channels—a specific type of forward control channel. Once a mobile station cellular phone successfully receives a paging data transmission using a forward paging channel, the cell site then commands the mobile station cellular phone to tune its radio receiver circuitry to a reverse control channel. Then additional digital communications messaging occurs in which call processing commences resulting in the assignment of a voice channel to carry the remainder of the cellular phone call.

The more complex versions of this invention configure the simulated control channel transmission emanating from (AUXS) 13 so that a variety of invalid call-origination-message parameters, in addition to (MIN) and (ESN), are employed as is described in the following more sophisticated systems shown and explained in the specification.

Description of a Moderately Complex Cellular Fraud Deterrent System

The cellular system of FIG. 1 consisting of a single cell is not a practical system architecture for serving a large area having a substantial mobile customer base. Therefore, it is desirable to consider a more complex system having a plurality of cells. By way of example only, a moderately complex system having three contiguous cells A, B and C each of which is serviced by a cell-site radio-transceiver station A1, B1, or C1 dedicated to a single cell of the group A, B and C, respectively is considered in FIG. 3.

Each of the stations A1, B1 and C1 has a transceiver antenna tower A2, B2, or C2 which is shown located generally at the physical center of its associated cell, although this central location is generally not a necessary requirement for cellular cell system design.

Each of cells A, B and C is subdivided into three 120-degree sectored angular areas designated in the art with Greek identification characters α, β or γ. Each of these α, β and γ sectors is serviced by directional radio transmissions emanating from or to directional transmitter and receiver antennas supported on their respective cell-site towers.

Each of the intangible geographic planes, or sources of radiation positioned at a tower antenna and serving a single α, β or γ sector is commonly called a sector "face" by cellular engineers. For example, cell A serviced by tower A1 has three radiation faces αA, βA and γA, having 120 degree directional radiation characteristics transmitting into the α, β and γ sectors of cell A.

(AUXS) 13 is shown centered at the junction of the α, β and γ sectors of cells A, B and C, respectively; and as such, transmits from omni-directional antenna 20 its signal into the sectored areas serviced by faces βA γB and αC. This centered location for (AUXS) 13 is not a mandatory requirement. In general, (AUXS) 13 may be located anywhere within a cellular system; however, appropriated adjustment must be made to the operations parameters for both (AUXS) 13 and the cell-site transmissions to accommodate for the change in location.

At the inception of the cellular system concept, the cell sites used transmitter and receiver antennas whose radiation patterns were omni-directional in the horizontal plane. The use of omni-directional antennas have traditionally been depicted by a center-exited cell site platform. The phrase omni-directional cell site refers to a site equipped with omni-directional voice channel antennas.

In mature systems, cell sites have three faces, that is, each voice channel in a cell site will transmit and receive over one of three 120 degree sector antennas rather than over an omni-directional antenna. The antennas are not generally center oriented as shown in FIG. 3, but each sector antenna is located at the junction of two sides of hexagonal sided cells so that extension of the edges of the antennas front lobes form the sides of the cell. These "corner-excited" cells are customarily employed to implement the tri-directional coverage of sectored cell sites in mature systems.

Cell sites are very expensive investments. The initial cost of a cell site before installation of any voice channel transceiver, is much greater than the incremental cost of each subsequently installed voice channel. At the conception of a system, the number of cell sites is governed mostly by the need to span the desired coverage over. At this stage omni-directional cell sites are used because the initial cost of an omni-directional cell site is lower than that of a directional cell site. In mature systems, however, the commercial requirement to cut cost by reducing the total number of cell sites needed to serve the existing telephone traffic load is the motivation for using the directional cell sites that are corner excited.

Nevertheless, the general structure and theory of operation of the (CFDS) of this invention is essentially the same whether the cell sites are center excited or corner excited, and also whether or not the cells are sectored.

In comparison with in omni-directional land transmitting antennas, a directional antenna can deliver the same signal strength in the region that it serves while covering substantially less interference with co-channel cells which lie outside the 120 degree wedge which the front lobe energizes. Similarly, a directional land receiving antenna substantially attenuates interference received from mobile units at bearings not spanned by the front lobe. If omni-directional systems and directional systems are to have comparable radio-frequency signal to interference relationship, the directional system can operate with a smaller channel reuse ratio, that is, a closer spacing between co-channel sites.

The use of three faces at each site with the orientation described with reference to FIG. 3 leads to convenient symmetries and relationships in a system design. A cellular system could be designed, however, for some other number of faces at each cell site.

Physical deployment and operation of the (AUXS) 13 located as shown in FIG. 3 centered between each cell-site A1, B1, and C1, must entail carefully manipulated digital communications parameters. The purpose of manipulating digital communication parameters involves causing call-origination messages which are transmitted by (AUXS) to be ignored by appropriate system and subscriber antenna receivers operating within the cellular communications system in which the (CFDS) is deployed. Such digital communication parameters include reverse control channels pertaining to each cell site face, Digital Color Code (DCC) parameters pertaining to each cell-site face, and message class type parameters—a type of cellular communication digital message class type—which is discussed in detail in a later section of this specification. A cellular communications system makes use of a cell-site plan in which such aforementioned digital communications parameters are carefully selected pertaining to each cell-site sector geometry. A proper cell-site plan includes by necessity the utilization of a specific reverse control channel pertaining to each cell-site face geometry in combination with one specific (DCC) parameter. Such a (DCC) parameter is necessary to allow proper differentiation of a cell-site face in one location utilizing one specific reverse control channel and a cell site face in a different location utilizing the same reverse control channel.

By way of example and referring to FIG. 3, face βA of cell-site A1 is assigned reverse control channel 334 in combination with a (DCC) of value of zero, face γB of cell site B1 is assigned reverse control channel 340 in combination with a (DCC) value one, face αC of cell-site C2 is assigned reverse control channel 350 in combination with a (DCC) of value of two. (AUXS) 13 must be deployed utilizing the same reverse control channels assigned the faces βA, γB and αC and so structured to transmit with three (DCC) values which are different than the channel (DCC) values used by each corresponding reverse control channel assigned face βA of cell-site A1, face γB of cell-site B1, and face αC of cell-site C2. To satisfy this example, (AUXS) reverse control channel 334 may be set to utilize a (DCC) of value one, (AUXS) reverse control channel 340 may be paired a with (DCC) of value two, and (AUXS) reverse control channel 350 may be paired with (DCC) of value zero. Such a combination of reverse control channel and (DCC) values prevents cell sites A1, B1, and C1 from recognizing call-origination messages transmitted from (AUXS) as being valid, hence satisfying the requirement that the (CFDS) invention be deployed in such a way to prevent interference with the operation of authorized subscriber stations from operating successfully by completing calls within the cellular system in which it is present.

Figure 4:
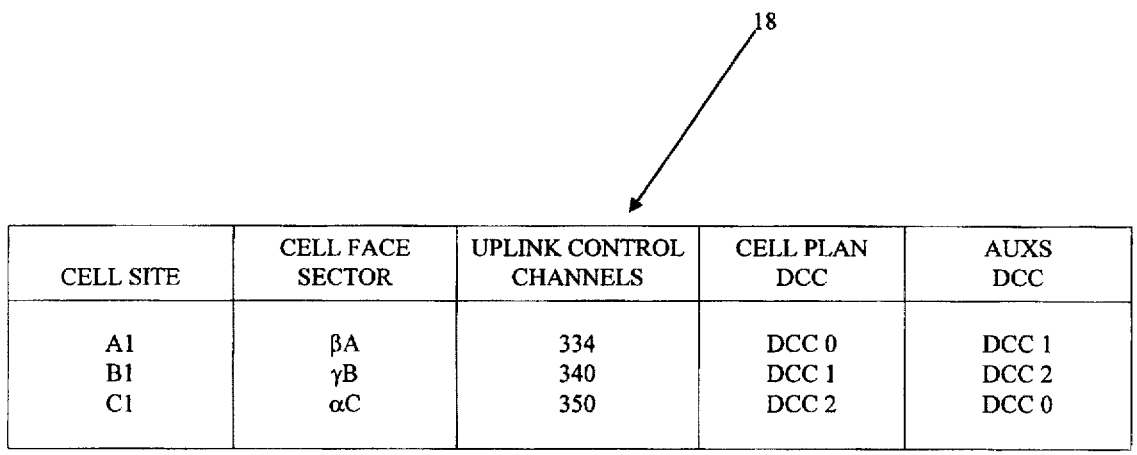
FIG. 4 shows a cell-plan parameter table applicable to the system of FIG. 3 which sets forth the relationship between assigned cell sites, cell-face sectors, reverse control channel assignments, cell-plan Digital Color Code (DCC) assignments, and auxiliary-station (AUXS) Digital Color Code (DCC) assignments needed to insure successful (CFDS) deployment with no interference with normal cellular system call processing.

The (AUXS) 13 deployment example of FIG. 3 is summarized in the table of parameters 18 shown in FIG. 4. The cell plan layout of this example entails, cell-site A1 serving cell-face sector βA with a (DCC) set to 0. Likewise, this cell plan layout involves cell site B1 serving cell-face sector γB utilizing reverse control channel 340 while receiving call-origination messages on this channel incorporating a (DCC) of 1. Finally, cell-site C1 serving cell face sector αC utilizing reverse control channel 350 with a (DCC) set to 2. For purposes of example, (AUXS) 13 located as shown in FIG. 3 transmits from omni-directional antenna 20 call-origination messages sequentially alternating on reverse control channels 334, 340, and 350. Each (AUXS) 13 call-origination message transmitted on reverse control channel 334 utilizes (DCC) of 1, as opposed to (DCC) of 0 which the cell plan layout expects. Thus, cell-site face β of FIG. 3 ignores and thus rejects the call-origination message transmitted by (AUXS) 13 on channel 334. Similarly, each call-origination message transmitted by (AUXS) 13 on reverse control channel 340 utilizing a (DCC) of 2 is ignored and rejected. Also, each call-origination message transmitted on reverse control channel 350 by (AUXS) utilizing a (DCC) of 0 is also ignored and rejected. Thus, each parameter outlined in the chart shown in FIG. 4 insures that every call-origination message transmitted by (AUXS) 13 of FIG. 3 will not interfere with the reception of valid call-origination messages by cell-sites A1, B1, or C1. This lack of interference also prevents overloading cell-sites A1, B1 and C1 by signals transmitted by (AUXS) 13 by using system time because the use of inoperative (DCCs) blocks the invalid (MIN-ESN) parameter combinations from using system components and unnecessary processing time to render a database comparison of invalid and valid parameter combinations.

(RS) 12, however, receives a sequential, commingled mixture of invalid and valid (ESN) and (MIN) parameter combinations from within the sectored cells of A, B and C of the more complex system of FIG. 3.

Description of a Complex Cellular Fraud Deterrent System

An expanded and more complex cell-plan system 19 is illustrated in FIG. 5. This complex cell plan is commonplace in commercial cellular systems, and is useful in explaining the more extensive ramifications of (CFDS) configuration and deployment to avoid loading any cell site that would be subject to the loading by (AUXS) 13 transmissions. Its important to note, that no cell-site in a cellular system should be loaded by (AUXS) 13 transmissions; and (AUXS) 13 must be programmed with invalid parameters to accomplish that objective.

In general, areas served by cell sites that utilize different reverse control channels (RECC) than those used in (AUXS) 13 transmissions do not need additional protection because those cell-site areas are protected by the use of the different reverse control channels (RECCs), and an area served by a cell-site that utilizes a different (DCC) than the one or more (DCCs) used in (AUXS) 13 transmissions does not need protection because that cell-site area is protected by the different (DCC).

The areas that need protection against undesired cell-site loading are those remote areas in the cell plan which are distant from the area protected against a reader station (RS) by (AUXS) 13 transmissions. Because of control-channel frequency reuse and also the limited number of (DCCs) available, in a system having a large number of cells and cell-sites, certain cell-plan areas served by cell sites that are remote from the area protected by (AUXS) 13 transmissions against fraud will use the same reverse control channel (RECC) and (DCC) as (AUXS) 13. In that remote area in which fraud-deterrent protection is not planned or intended, undesired cell-site loading can occur because of the use of the same reverse control channel (RECC) and the same (DCC). To avoid this unintended and undesired loading of the remote cell site, (AUXS) 13 transmits as part of its simulated and invalid call-origination message a call-class type parameter (Order, Qualification, and Local Control Codes) which is invalid and is an abnormal AMPS call-class-message parameter for that remote cell site. It is this invalid call-class message parameter that prevents loading the remote cell site.

To elaborate further concerning the technique involving modifying (DCC) values to prevent undesirable cell-site loading, consider for purposes of example a cell-site plan 19 illustrated in FIG. 5 in which (AUXS) 13 is transmitting call-origination messages in sequence from an omni-directional antennas 20 located at the top of cell-site tower D1. The first technique serving to prevent cell-site loading by altering (DCC) is useful to prevent cell-site loading of cell-sites D1, G1, E1, K1, and H1 shown in FIG. 5. In addition to the cell-sites mentioned, the second technique of altering call-origination message call class type serves to prevent cell-site loading of remote cell-sites J1, F1, and L1.

Figure 6:
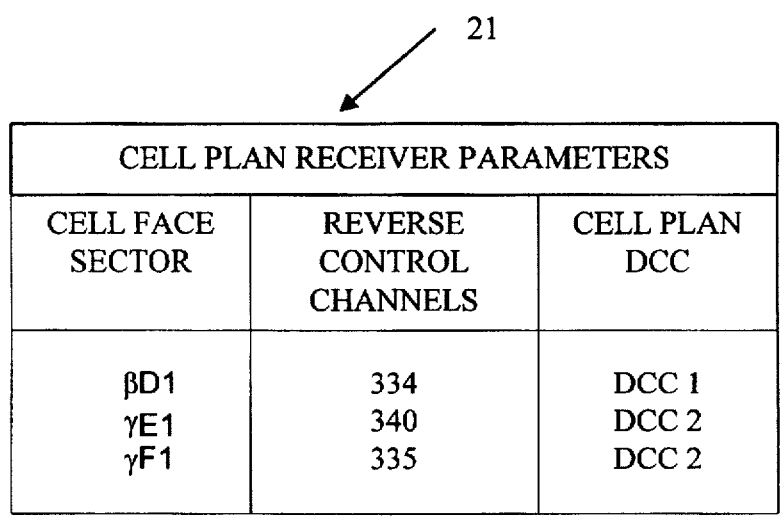
FIG. 6 shows a cell-plan parameter table applicable to the expanded cell-plan system of FIG. 5 which describes the relationship between assigned cell-face sectors, reverse control channel (RECC) assignments, and cell-plan Digital Color Code (DCC) assignment information useful in explaining techniques used to prevent undesired loading of cell-site receiver systems.
Figure 7:
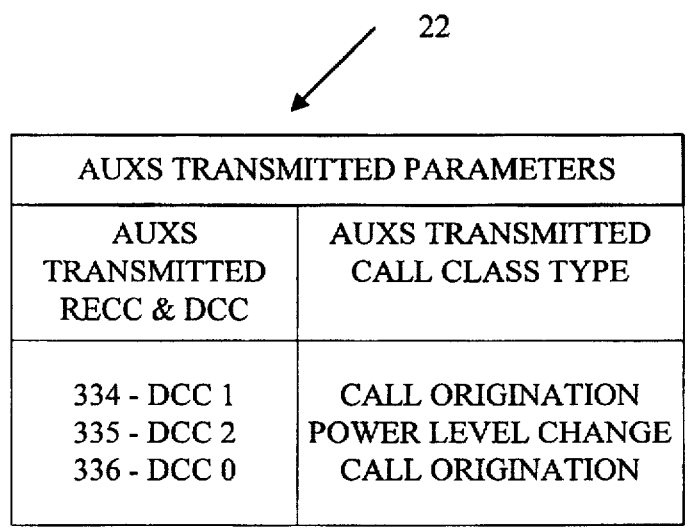
FIG. 7 shows a cell-plan parameter table applicable to the expanded cell-plan system of FIG. 5 which describes the relationship between call-origination messages transmitted at an auxiliary station (AUXS) located at a cell-site shown in FIG. 5 where call-origination messages are transmitted using specific reverse control channel (RECC) assignments in combination with specific Digital Color Code (DCC) parameters and call-class parameters.
Figure 10:
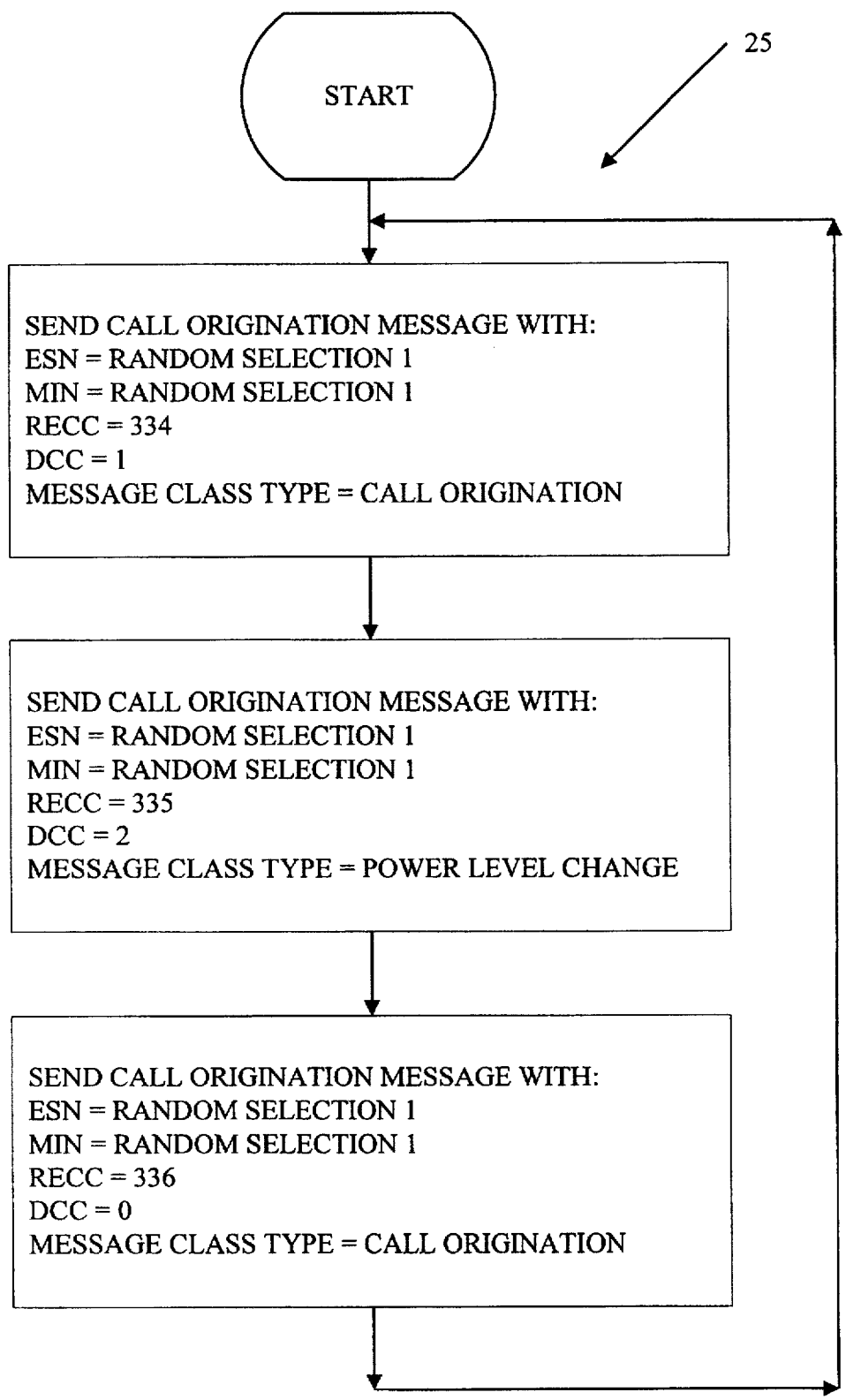
FIG. 10 shows a flow-chart indicating the process by which call-origination messages containing the parameters Electronic Serial Number (ESN), Mobile Identification Number (MIN), reverse control channel (RECC), Digital Color Code (DCC), and message class types fields are transmitted in sequence on specific reverse control channels (RECC) by auxiliary station (AUXS)

A detailed analysis of the cell plan shown in FIG. 5 shows that cell-site D1 has associated with it three cell-site faces α, β, and γ spaced at 120 degree intervals surrounding the cell-site tower. The cell-plan example of FIG. 5 shows sector αD1 utilizing reverse control channel (RECC) 334 in combination with Digital Color Code (DCC) 0, and sector βD1 utilizing reverse control channel (RECC) 334 in combination with Digital Color Code (DCC) 1, and sector γD1 utilizing reverse control channel (RECC) 334 in combination with Digital Color Code (DCC) 2. It is therefore necessary that (AUXS) 13 transmitting from antenna 20 located on top of the tower at cell-site D1 also use reverse control channels (RECC) 334, 335, and 336 sequentially. It is necessary that digital call-origination messages transmitted by (AUXS) 13 use different (DCC) values than those utilized by cell-site D1 in order to avoid the possibility of loading receivers at cell-site D1. Therefore, in this example, (AUXS) 13 sequentially transmits on reverse control channel (RECC) 334 using a (DCC) of 1, (RECC) 335 using a (DCC) of 2, and (RECC) 336 using (DCC) of 0. Flow chart 25 of FIG. 10 shows the sequential process by which call-origination messages are transmitted incorporating digital call-origination parameters necessary to serve as an effective fraud deterrent concerning this example. Such (RECC) and (DCC) parameters concerning (AUXS) 13 transmissions of this example of FIG. 5 are shown in table format in FIG. 6 and 7. Concerning FIG. 5 consider cell-face sector βD1 of immediately located cell-site D1 in which the receiving antenna system at βD1 expects call origination messages to be received on channel 334 in combination with a (DCC) of value 0. Due to the fact that (AUXS) 13 is transmitting on (RECC) 334 using a different (DCC) value of 1 there is no undesirable cell-site loading problem concerning cell-face βD1. Continuing examination of FIG. 5, consider cell-face γE1 of cell-site E1 which is located adjacent to cell-site D1 where (AUXS) is transmitting. Cell-face sector γE1 receives call-origination messages on (RECC) 340 using (DCC) 2. Call-origination messages transmitted by (AUXS) 13 do not cause a cell-site loading problem concerning cell-face sector γE1 because (AUXS) 13 does not transmit on (RECC) 340. Consider remote cell-face sector γF1 as shown in tabular form in FIG. 6, where cell-face sector γF1 receives call-origination messages on (RECC) 335 using (DCC) 2. In order to prevent call-origination messages transmitted by (AUXS) from loading cell-face sector γF1 it is necessary to alter the call class type digital message parameter from a normal "Call Origination" call class type to an invalid or abnormal call class type for sector γF1 , typically a "Power Level Change" call class type. As shown in FIG. 7 and FIG. 8, a multitude of call-class type parameters are available to be altered, proving useful to accomplish generation of an invalid message which is ignored by cell-site receivers. Most frequently, the use of a "Power Level Change" call class message type serves this purpose well.

In the cell plan for the cellular system of FIG. 5, no cell site is loaded because of the proper programming of (DCCs), reverse control channel assignments; and in one cell-face sector only where (AUXS) 13 and sector γF1 use the same (DCC) and reverse control channel, loading is prevented by employing an abnormal call-class type in the call-origination messages transmitted by (AUXS) 13.

Description of Circuits

Figure 11:
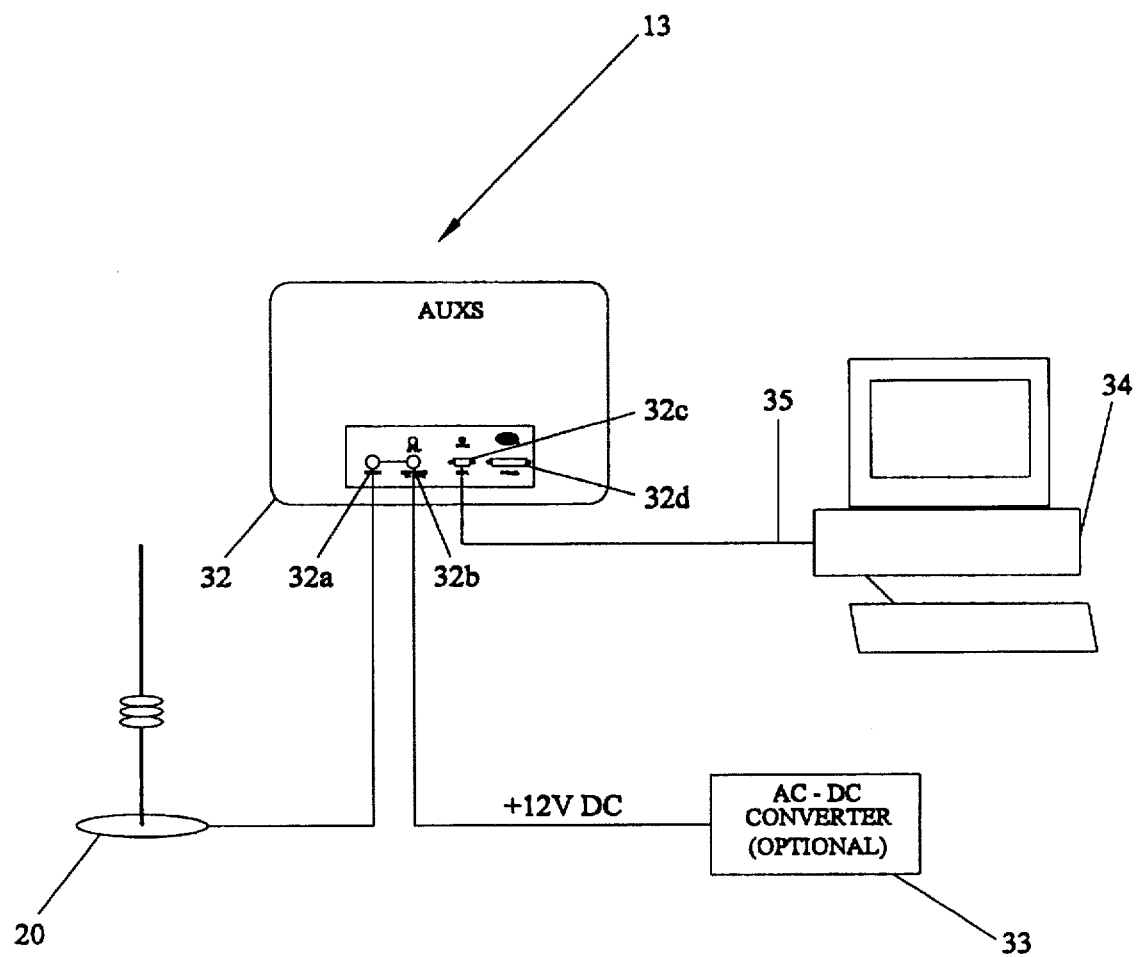
FIG. 11 shows the major physical components that make-up the auxiliary station (AUXS) necessary to transmit invalid parameters.

In order to express a clear idea of the components necessary to create and operate a functional auxiliary fraud-deterrent transmitting system (AUXS), a block diagram of (AUXS) 13 is illustrated in FIG. 11 consisting of a transmission substation 32 which in a preferred embodiment is essentially a portable suitcase, an optional external converter power supply source 33 (required if a 12 volt DC source is not available), a transmit/receive omnidirectional antenna 20, a database management computer system 34 to input invalid parameters into substation 32, connected to substation 32 by a cable 35 utilized for serial data communications between the connected component. Substation 32 has a connector subassembly consisting of antenna 20 connector 32a, 12 volt, direct-current power-supply connector 32b, serial port 32c, and parallel port 32d. Antenna 20 is coupled directly to connector 32a, a 12 V. DC power source is connected to connector 32b, and the database management system connected to either serial port 32c or parallel port 32d depending upon the output database management computer system 34. Computer system 34 is a separate physical unit programmed by the system operator with invalid parameters.

Figure 12:
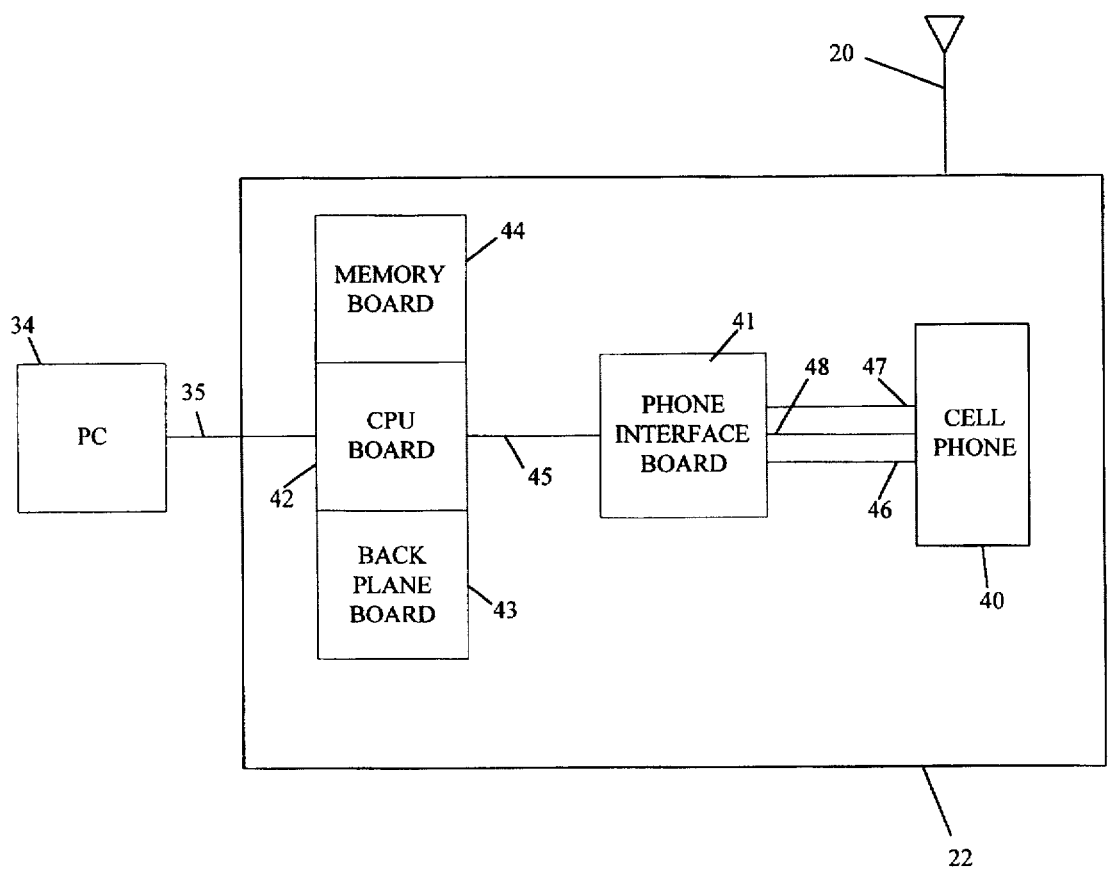
FIG. 12 shows a simplified hardware block diagram containing the major components of the auxiliary station (AUXS)

The physical auxiliary (AUXS) substation unit 32 consists of several components illustrated in hardware block diagram form in FIG. 12. Specifically, the auxiliary (AUXS) transmission substation consists of a modified Motorola cellular phone transceiver 40, transmit/receive antenna 20, a custom cellular Phone Interface Board 41, a modular form factor Central Processing Unit (CPU) device 42, a power supply back-plane circuit 43, and a non-volatile storage unit memory board 44. In addition, a personal computer (PC) 34 is utilized on a temporary basis in order to download a database of invalid (MIN) and (ESN) combination parameters. The personal computer (PC) 34, is periodically connected to the (CPU) device 42 by a serial communications channel 35. Likewise, an additional serial communications channel 45 is connected between the Phone Interface Board 41 and the modular form factor (CPU) device 42. Specifically, the serial communications utilized for both channels 42 and 45 is specified as type RS-232C protocol under specifications set forth by the Institute of Electrical & Electronics Engineers. It is necessary that Phone Interface Board 41 have access to needed control signals contained within cellular phone transceiver 40 in order to control the cellular phone. Interface and control channels between the Phone Interface Board circuit 41 and the modified Motorola cellular phone transceiver 40 consist of three channels namely a 3-wire bus control channel 46, a Manchester data transmit communications channel 47, and a Manchester data trigger channel 48.

Figure 13:
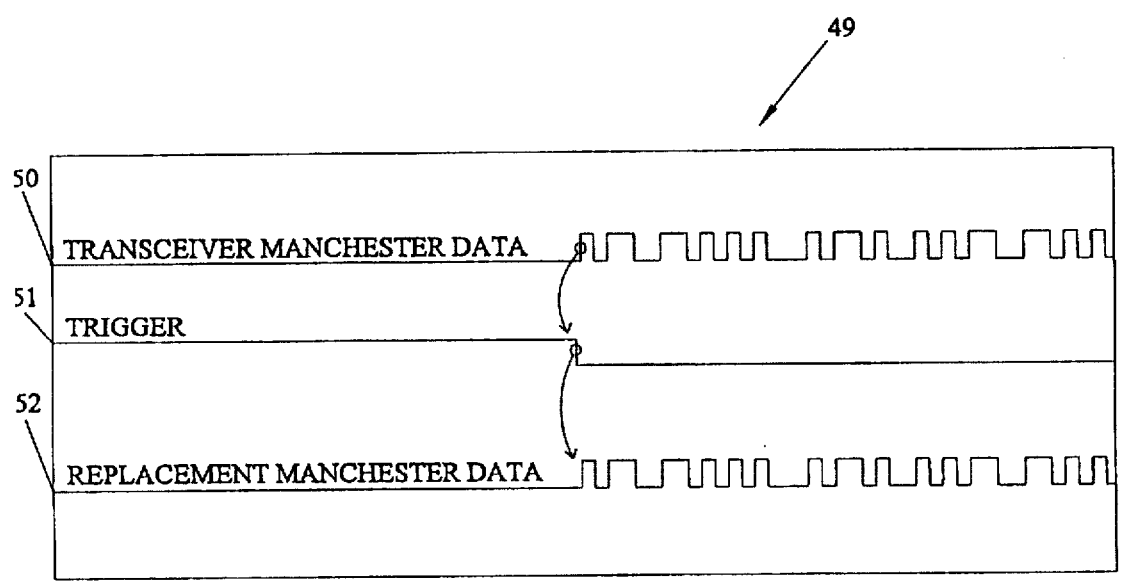
FIG. 13 shows a signal timing diagram illustrating timing sequence information regarding a Manchester coded digital communications data stream produced by a cellular phone transceiver and a corresponding trigger signal, which in turn causes initiation of a replacement Manchester coded data stream produced by a Phone Interface Board required to enable proper operation of the auxiliary station (AUXS)

The cellular phone transceiver 40 needs to be modified in such a way as to intercept a normal Manchester encoded data-stream, specific characteristics of which are discussed in a later section, produced by internal cellular phone circuitry, and replace the produced Manchester data signal with a customized Manchester coded data signal produced by a cellular phone interface board 41. Such replacement signal is then routed into the cellular phone transceiver 40 using data channel 47 in such a way that the Manchester data-stream signal is then modulated and transmitted by RF energy into the air—similar to normal cellular phone call origination functionality. The replacement Manchester coded data signal is generated by the cellular phone interface board 41 on an interrupt basis in order to achieve consistent timing. Such replacement Manchester coded data signal generated by the cellular phone interface board 41 is initiated by first receiving the original Manchester signal from the cellular phone transceiver and producing a trigger signal as a result. FIG. 13 illustrates a timing relationship 49 between the Manchester coded data stream 50 generated by the cellular phone transceiver 40 and a trigger signal 51 used to signify initiation of a replacement Manchester coded data stream 52. The first rising edge of the digital Manchester data stream signal from the cellular phone transceiver causes the trigger signal 51 to change state. A minimum signal timing period of 1 micro-second may exist between these two signals. This trigger signal 51 then initiates commencement of the replacement Manchester coded data signal 52 which is generated by the Phone Interface Board 41. Hence the electronic interface between the cellular phone interface board 41 and the cellular phone transceiver 40 consists of two signals—a trigger signal indicating timely data stream initiation, and the actual replacement Manchester coded data signal itself.

Figure 14:
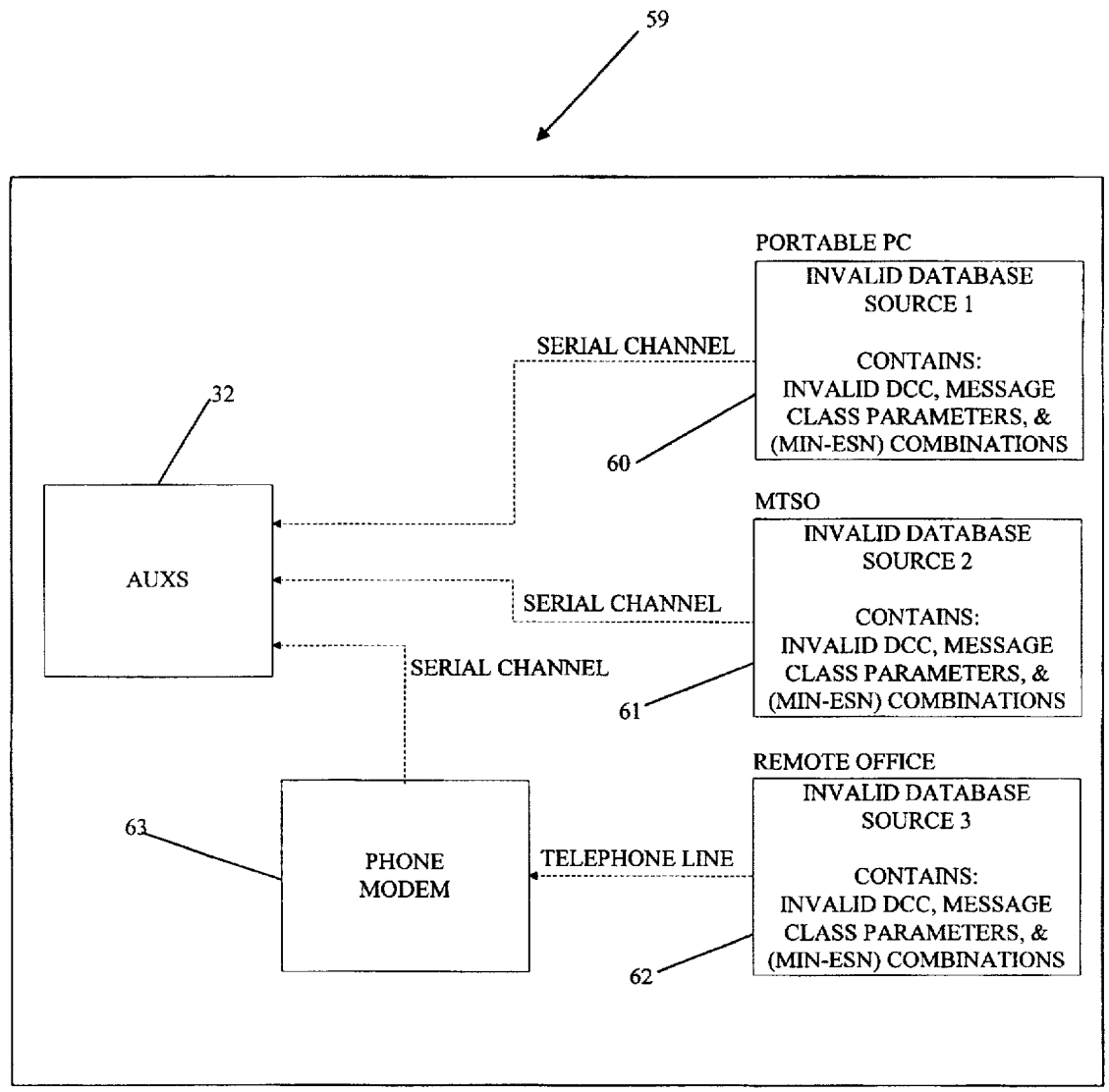
FIG. 14 shows a simplified hardware block diagram illustrating three possible sources by which invalid database information containing Digital Color Code (DCC), Order Code, and call origination record parameters may be loaded into the auxiliary station (AUXS)

A database of known invalid (MIN) and (ESN) combination parameters is provided by the cellular phone communications operator engaged in deployment of the (CFDS). Auxiliary station (AUXS) 13 accesses such a database of necessary (MIN) and (ESN) parameters in one of several ways 59 as illustrated in FIG. 14. Database information may be downloaded into the auxiliary system (AUXS) by serial communications channel to a portable computer system 60, by communications channel routing to the MTSO 61, or by a phone modem 63 communications channel to a centralized remote office location 62. In each case, the database is maintained by the cellular communications corporation responsible for deployment of the (CFDS). To maximize (CFDS) effectiveness, the database containing (ESN) and (MIN) combination parameters may be updated frequently.

Figure 15:
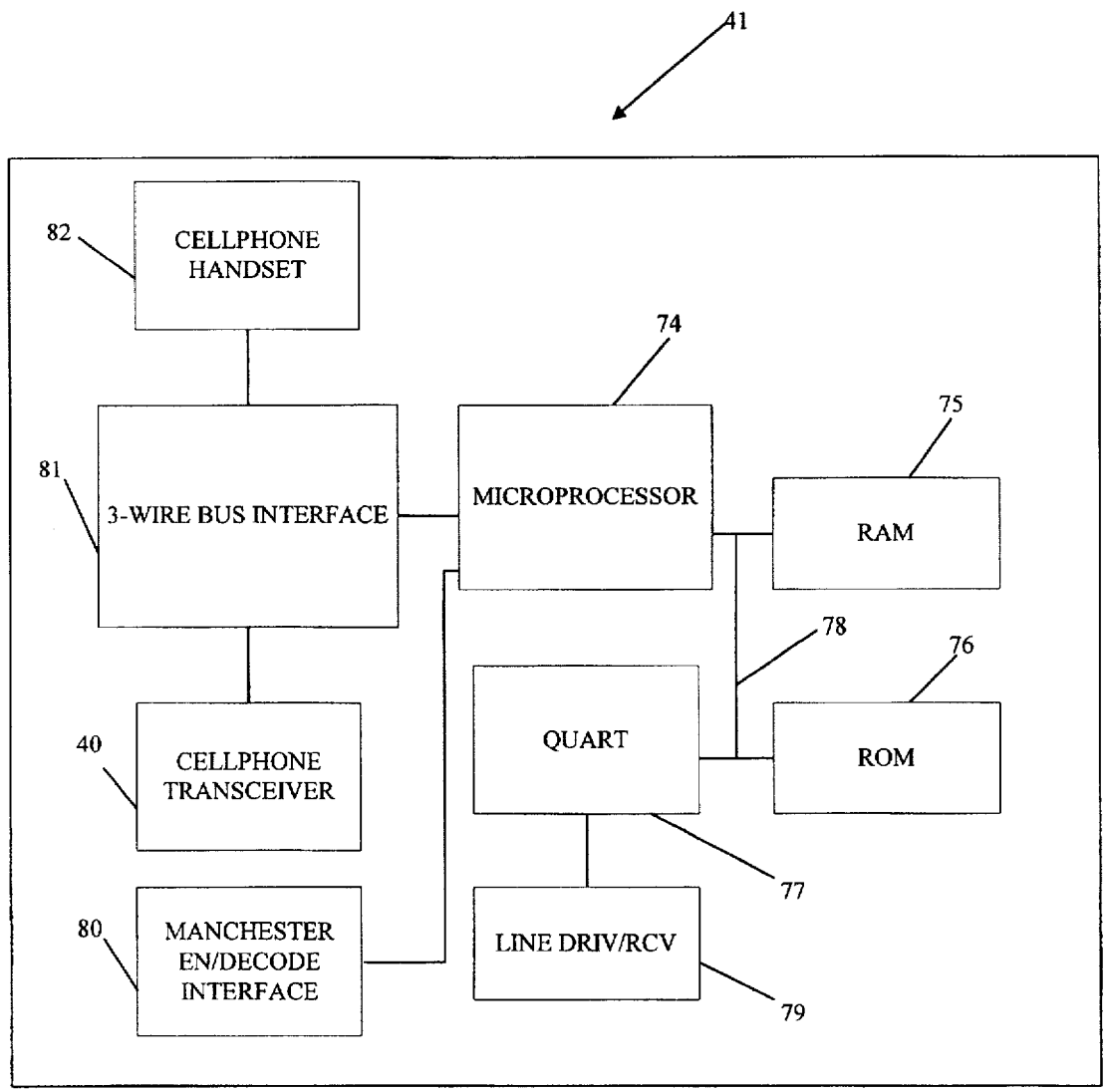
FIG. 15 illustrates an architectural hardware block diagram of a custom Phone Interface Board which is a major component of the auxiliary station (AUXS); with each sub-component being shown.

Custom cellular Phone Interface Board 41 is illustrated in block diagram form in FIG. 15. In order to clearly describe the functionality of custom Phone Interface Board 41 a block diagram description of such circuitry is beneficial. The Phone Interface Board system 41 consists of a microcontroller-based circuit utilizing a Philips 80C550 family microcontroller component 74. This microcontroller 74 utilizes Random Access Memory (RAM) 75 for operational temporary data storage. The microcontroller component 74 also utilizes Read Only Memory (ROM) 76 for program execution memory as well as non-volatile data storage. The microcontroller 74 interfaces to a Quad channel Universal Asynchronous Receiver Transmitter (QUART) 77 which is used for serial communications with external devices. The data interchange channel interfacing the microcontrontroller 74, (RAM) 75, (ROM) 76, and (QUART) 77 consists of an 8-bit address/data bus 78. Connected to (QUART) 77 resides a line driver/receiver component 79 used to convert logic level signals to communication signal levels meeting compatibility with Institute of Electrical and Electronics Engineering specification RS-232C. Cellular phone-call origination data communication is accomplished by routing Manchester encoded data between the Phone Interface Board 41 circuitry and the cellular phone transceiver 40. The Phone Interface Board circuitry 41 contains an Manchester encode/decode interface 80 through which such data communication is accomplished. The process of controlling functionality of cellular phone transceiver 40 is accomplished by a 3-wire bus interface 81. Such 3-wire bus interface 81 resides between a cellular phone transceiver 40 and an optionally utilized cellular phone hand set 82. The 3-wire bus interface 81 also connects to the microcontroller device 74 in which control is implemented.

Figure 16:
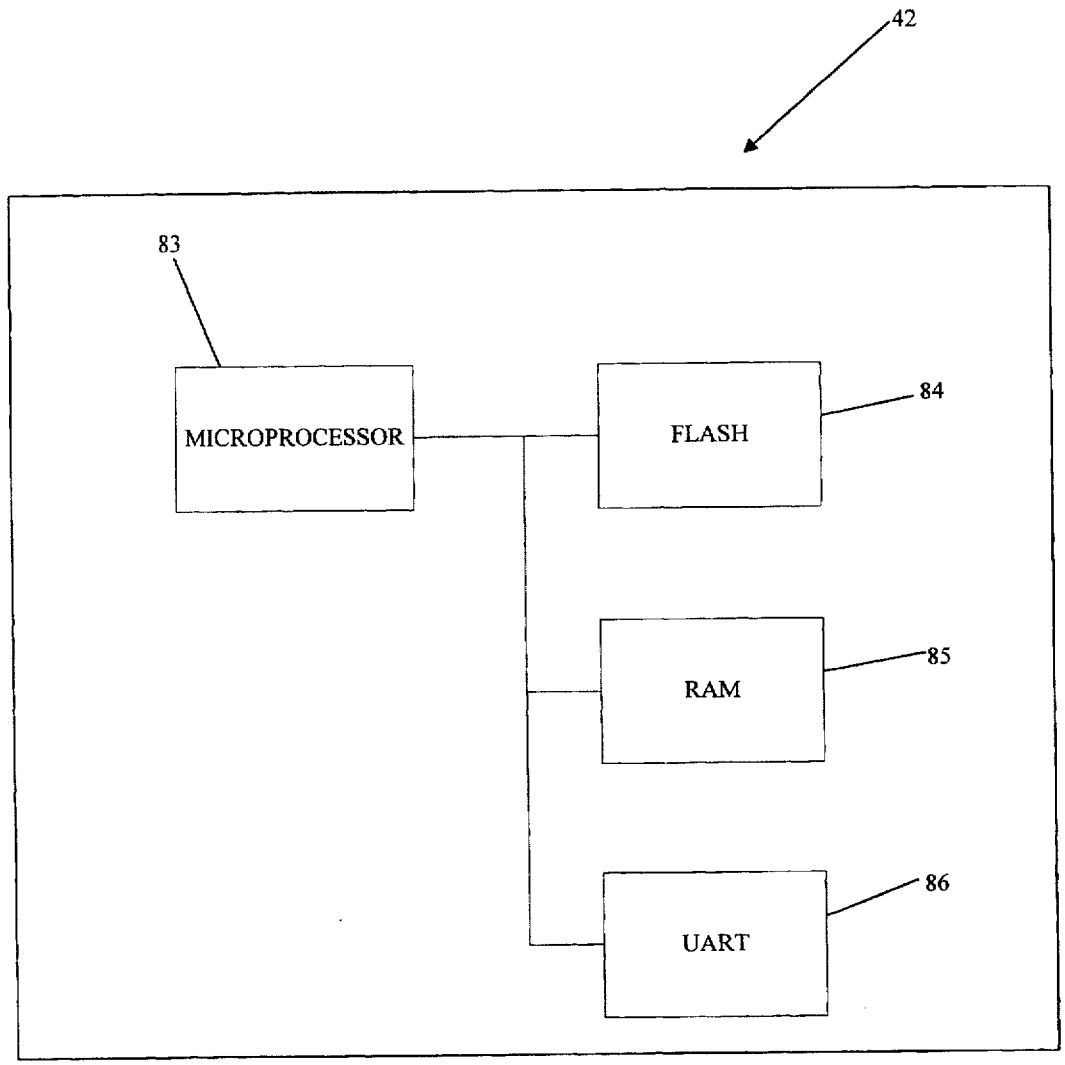
FIG. 16 illustrates an architectural hardware block diagram of a Central Processing Unit (CPU) board which is also a major component of the auxiliary station (AUXS) with each sub-component being shown.

An integral component of auxiliary system (AUXS) operation is the modular form factor Central Processing Unit (CPU) board 42 which is illustrated in block diagram form in FIG. 16. The (CPU) board is a purchased device which is integrated into the (AUXS). The (CPU) board consists of four major functional units. Namely, a microprocessor unit 83 which is based on an Intel 8086 microprocessor device. Also, a FLASH unit 84 functions to store the invalid (MIN) and (ESN) database of information in a non-volatile manner such that power may be removed and reapplied while maintaining data integrity. A Random Access Memory (RAM) unit 85 functions to store data required for random access use during program execution. Further, a Universal Asynchronous Receiver Transmitter (UART) 86 functions as a means to implement serial communications with devices external to the CPU board 42 through serial communications protocol specified by the Institute of Electrical and Electronics Engineers as RS-232C.

Figure 17:
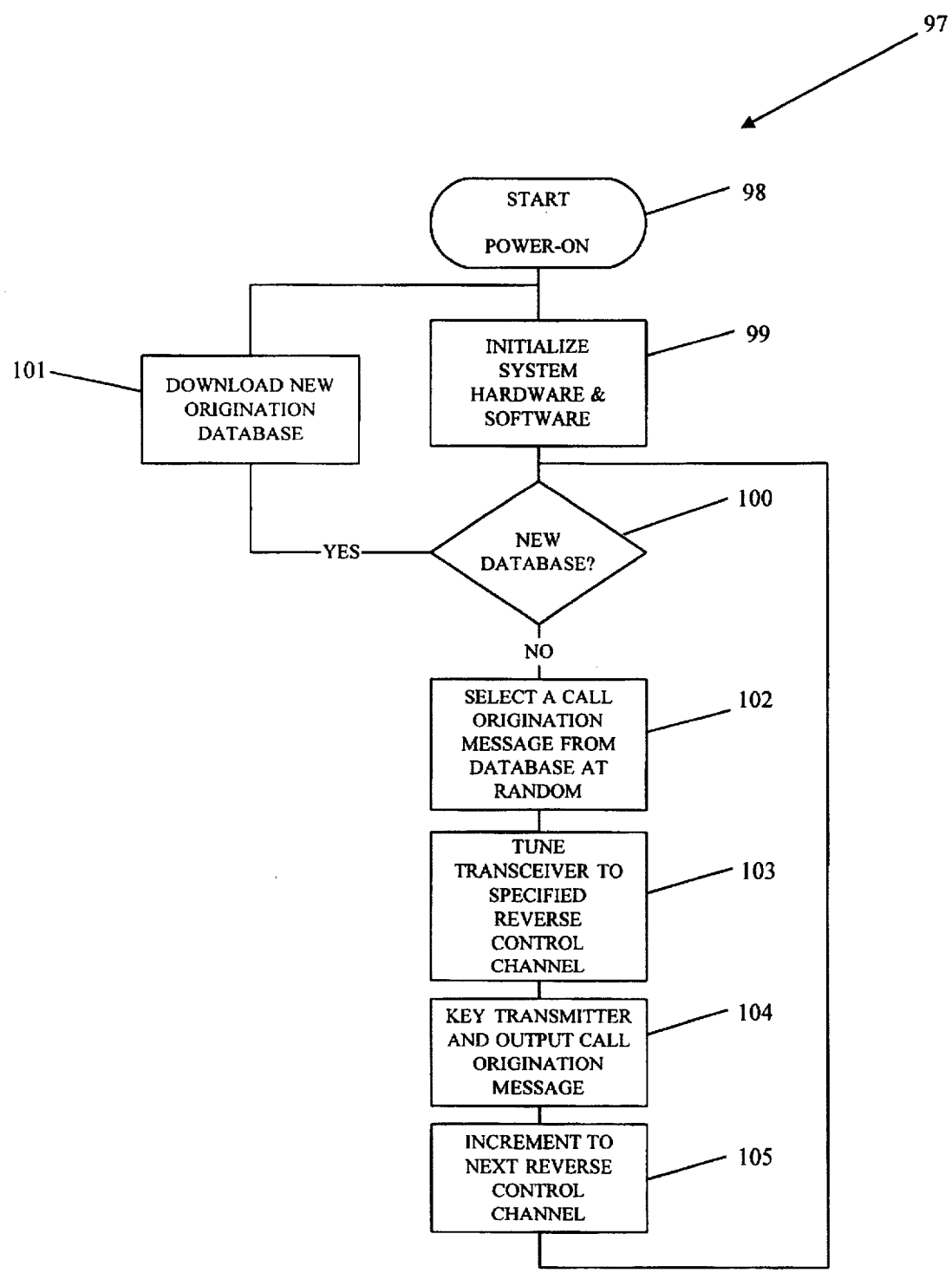
FIG. 17 shows a conceptual flow chart describing the process functionality of the entire auxiliary station (AUXS)
Figure 18A:
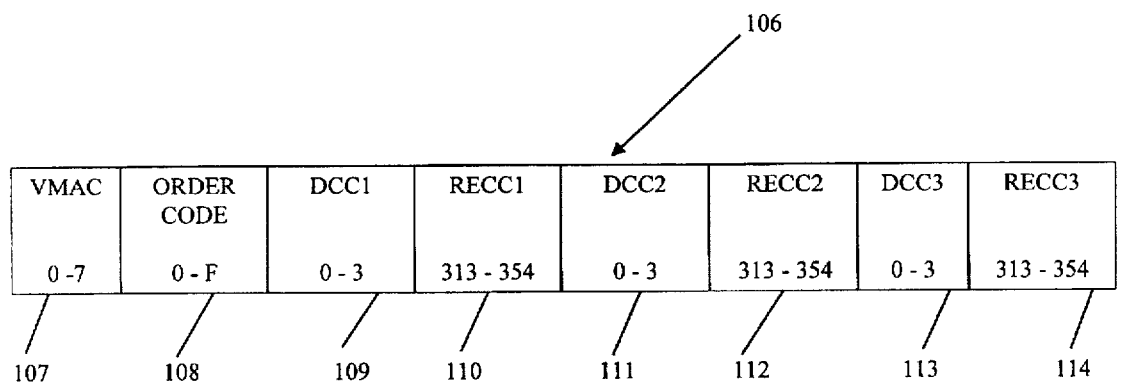
FIGS. 18A-B show reverse control channel call-origination database storage record formats which are created in a character based text file, downloaded, and stored in the auxiliary station (AUXS) in which this database contains vital initialization parameters and call-origination parameters including an invalid combination of Mobile Identification Number (MIN) and Electronic Serial Number (ESN)
Figure 18B:
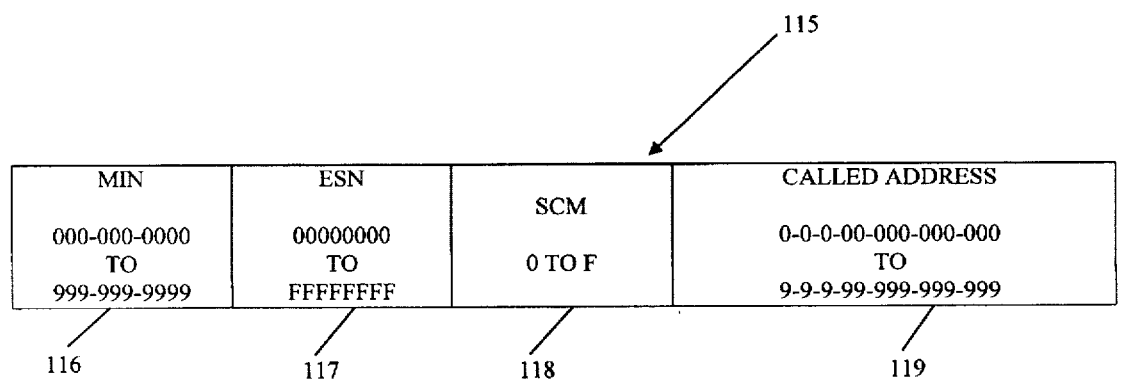

Auxiliary station 13 (AUXS) contains computer programs which operate according to a specific algorithm which is now described. The overall (AUXS) system processing algorithm illustrated as a flowchart 97 in FIG. 17 begins as (AUXS) 13 is powered on 98. Next, system hardware and software are initialized 99. Initialization includes reading an initialization record 106, format of which is illustrated in FIG. 18A-B, from a database stored in memory board 44 of FIG. 12. Input serial communications port 35 is then queried to determine whether a request has been made by the external PC 34 to download an invalid database of (MIN) and (ESN) combination parameters consisting of multiple origination records 117, as illustrated in FIGS. 18A-B, into auxiliary system (AUXS) 13. Upon a database request message being true, a decision 100 is made to download and store at 101 a new database containing invalid (MIN) and (ESN) call origination records, followed by a return to initialization of system hardware and software 99. Upon a database request message being false, processing continues to select at random 102 a call origination message record from stored database. Processing continues to tune 103 the cellular phone transceiver 40 to an reverse control channel as determined by a database record 115 (FIG. 18B) selected at random. Next, the cellular phone transceiver 40 transmitter is keyed causing an reverse control channel call origination message to be transmitted at 104, utilizing customized record parameters found in the origination record 115. The next sequentially selected reverse control channel is selected in sequence from the initialization record 106 (FIG. 18A) and the cellular phone transceiver 40 is commanded to tune 105 to such up-link control channel. Processing then continues to loop back to logical block 100 checking for a new database record present from serial communications channel 35.

The database stored in modular form factor memory board 44 consists of two record types. The first record contained in the stored database is an initialization record 106, illustrated in FIG. 18A. The initialization record consists of a VMAC parameter 107 ranging in value from 0 to 7, Order Code parameter 108 ranging in value from 0 to hexadecimal F, DCC parameters 109, 111, and 113 ranging in value from 0 to 3, reverse control channel parameters 110, 112, and 114 ranging in value from 313 to 354. The second and subsequent set of records contained in the stored database are origination records 115 (FIG. 18B). Such origination records consist of a Mobile Identification Number (MIN) 116 encompassing a 10 digit decimal number range, Electronic Serial Number (ESN) 117 encompassing an 8 digit hexadecimal number range, Station Class Mark (SCM) 118 encompassing a 1 digit hexadecimal range, and called address 119 encompassing a 14 digit decimal number range.

Figure 19A:
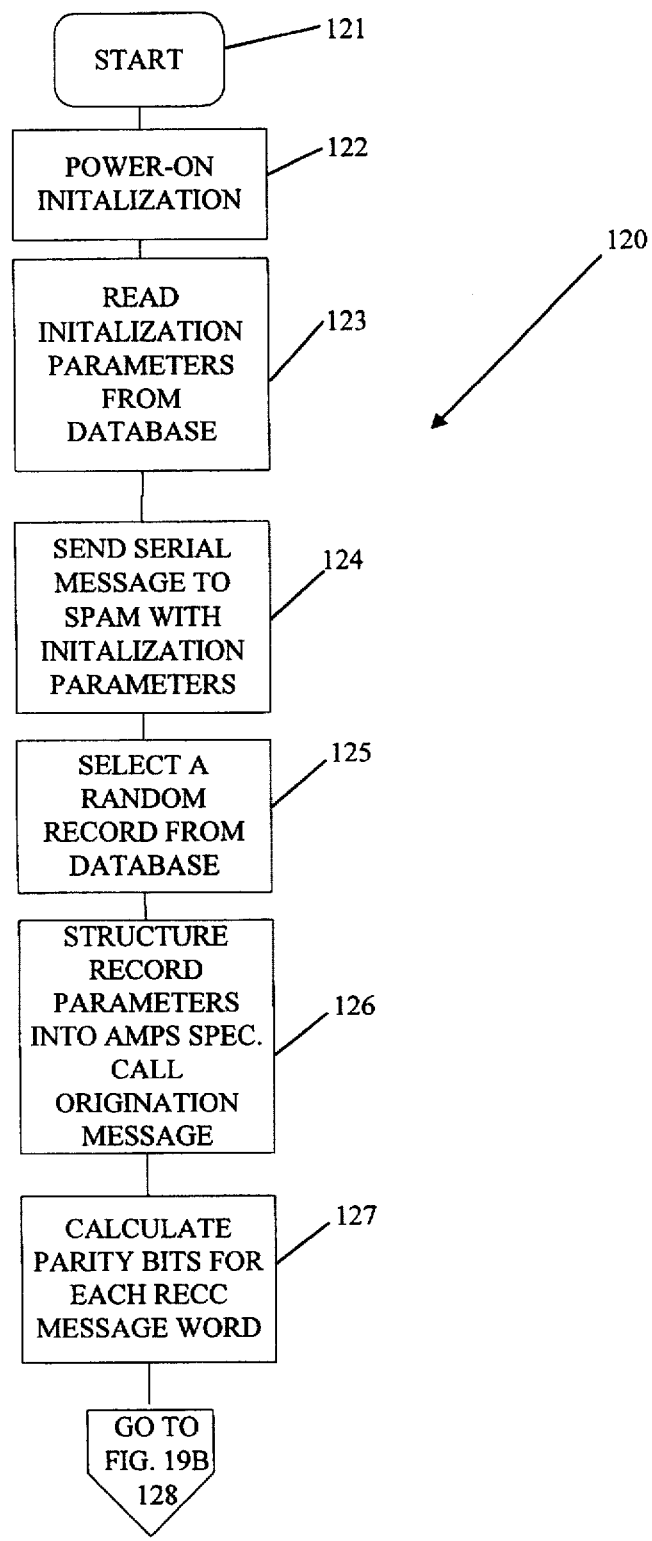
FIGS. 19A-B show a process flow chart detailing the firmware algorithm which is executed in a modular form factor Central Processing Unit (CPU) sub-component of (CFDS) wherein processing begins at power-up and continues in a continuous loop.
Figure 19B:
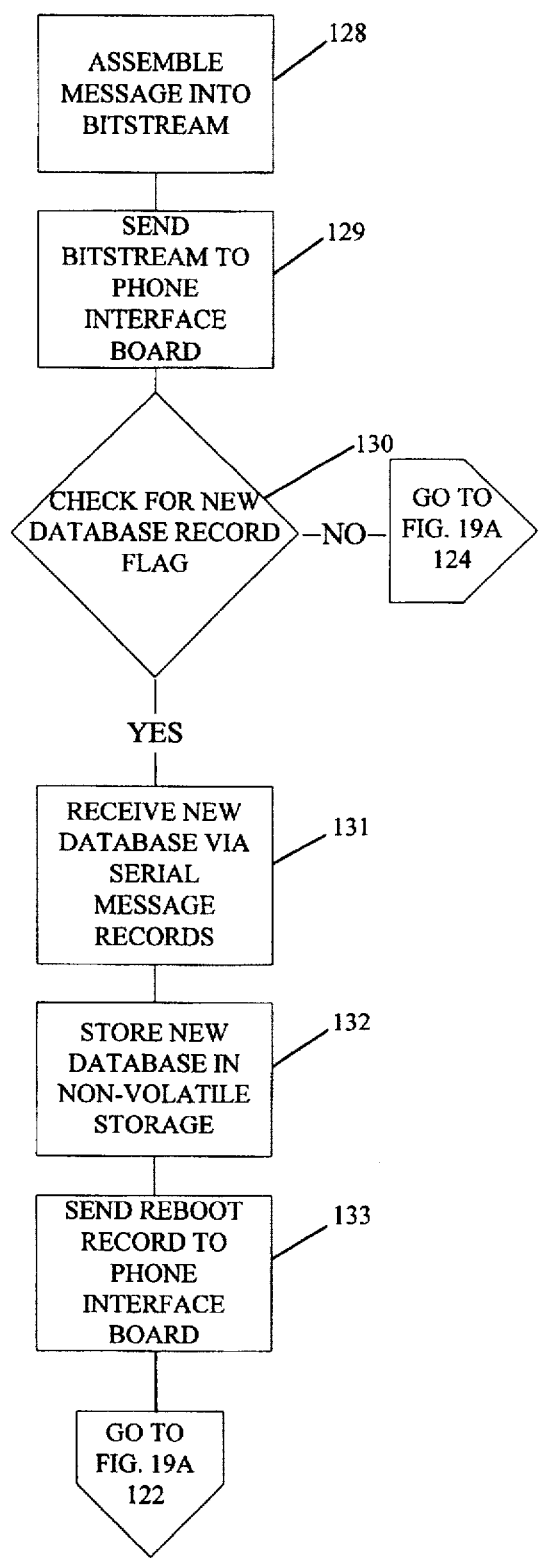

Operating functionality of the modular form factor (CPU) board 42 is described using an algorithm flow chaff 120 illustrated in FIGS. 19A-B. Processing begins 121 with power-on initialization 122 of necessary parameters. Initialization includes reading an initialization record 106, format of which is illustrated in FIG. 18A, from the database of invalid (MIN) and (ESN) combination parameters stored in memory board 44. Once the initialization record is read at 123 from database storage, the initialization record is then transmitted at 124 by serial communications channel 45 to custom Phone Interface Board 41. Next, a call-origination record 115 is selected from the stored database at random by 125. The origination record 115 is then structured at 126 into an AMPS specification call-origination message. Once completed it is necessary to calculate at 127 parity bits to complete the structure of each reverse control channel message word. Next, the origination message is assembled at 128 into a Manchester encoded data stream and then transmitted at 129 to the Phone Interface Board device 41 by serial communications channel 45. Next, a decision at 130 is made to determine whether a new origination database is available. This determination is made by checking incoming serial messages for a request to reload the call-origination database of invalid (MIN) and (ESN) combination parameters. Given the absence of an origination database reload request, processing branches to send at 124 a serial message to Phone Interface Board 41 with initialization parameters. Given a request for a database reload, a new database is received 131 by sequences of serial communication messages. Once a new call-origination database is downloaded, new data is stored 132 in non-volatile storage memory board 44. Finally, it is necessary to send 133 a reboot message to the Phone Interface Board 41 by serial communications messaging. Processing then returns to read 123 initialization parameters from call origination database.

Figure 20A:
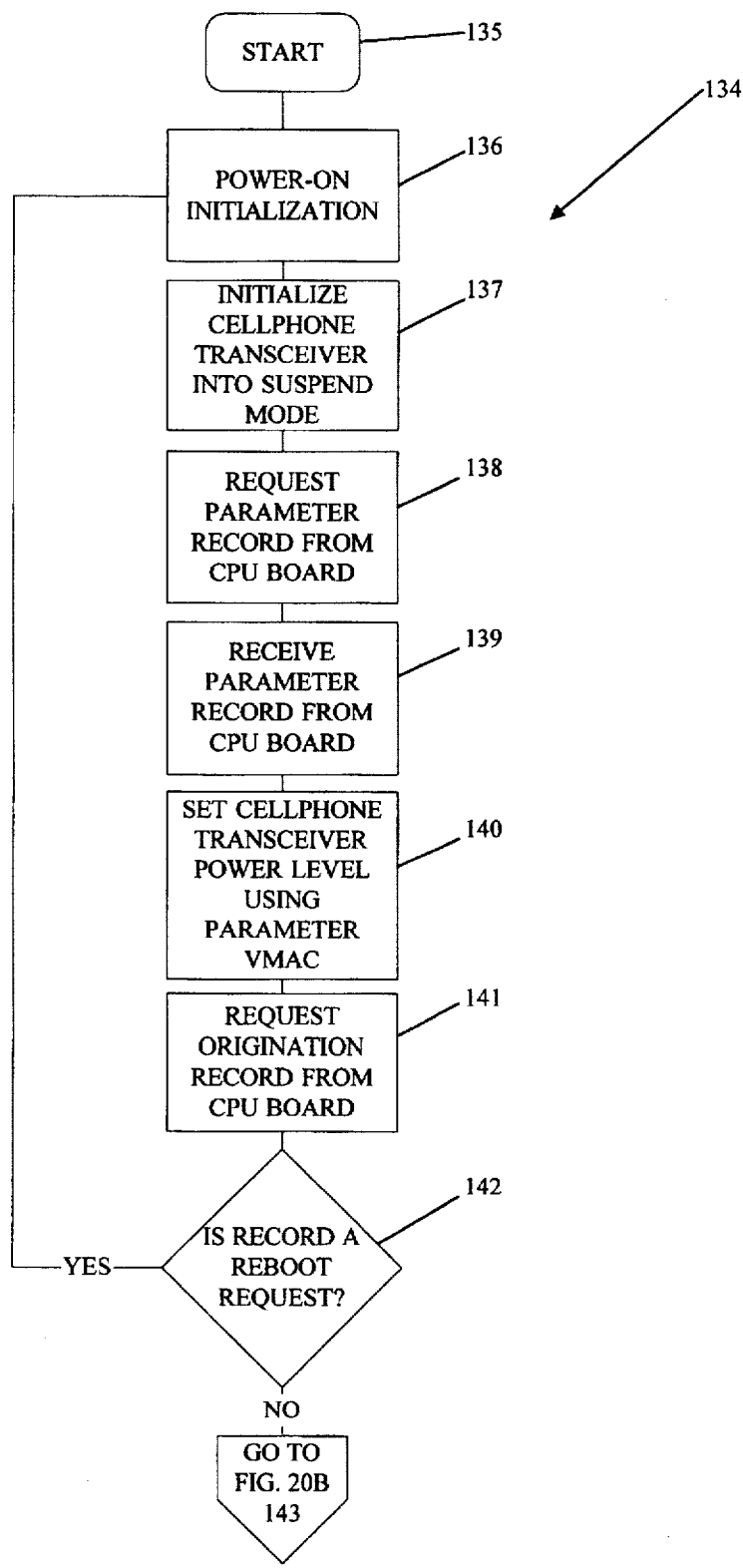
FIGS. 20A-B show a process flow chart detailing the firmware algorithm which executes in the Phone Interface Board sub-component of the auxiliary station (AUXS) describing processing which begins at power-up and continues in a continuous loop.
Figure 20B:
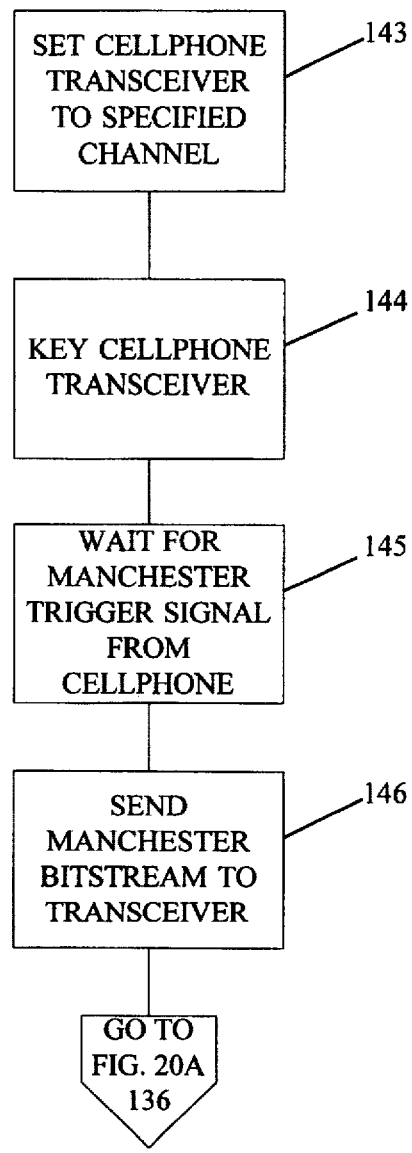

Operating functionality of the custom Phone Interface Board 41 is described using an algorithm flow chart 134 illustrated in FIGS. 20A-B. Processing begins at 135 as power is applied to the device. First, power-on initialization at 136 occurs to setup device configuration. The cellular phone transceiver 40 is initialized at 137 into suspend mode through the 3-wire bus interface channels 46, 47, and 48. A request message is then sent at 138 to the PC-104 CPU device 42 through serial communications channel 45 to request initialization parameters. Once such message is acknowledged a parameter record is received at 139 again from the PC-104 CPU device 42 through serial channel 45. Next, initialization parameter VMAC 107 is used to set at 140 the cellular phone transceiver 40 transmit power level through a 3-wire bus command. Call-origination parameters are then requested at 141 from the PC-104 CPU device 42. A decision at 142 is made to determine whether the incoming message is a reboot request a reboot or an origination record. Given the presence of a reboot request message processing proceeds to power-on initialization 136. Given the absence of a reboot request, a call origination message is received. The cellular phone transceiver 40 is tuned at 143 to the reverse control channel as specified in the origination message through a 3-wire bus command. Next a 3-wire bus command is used to key at 144 the cellular phone transceiver 40 to place a call. Based on a Phone Interface Board 41 processor interrupt signal a trigger indication is used to mark at 145 the beginning of a Manchester coded data stream. Once the beginning of a Manchester coded data stream is found, the Phone Interface Board 41 circuitry then generates and sends at 146 a custom Manchester coded bit stream to the cellular phone transceiver 40.

Call-Origination Message Specification

Figure 21:
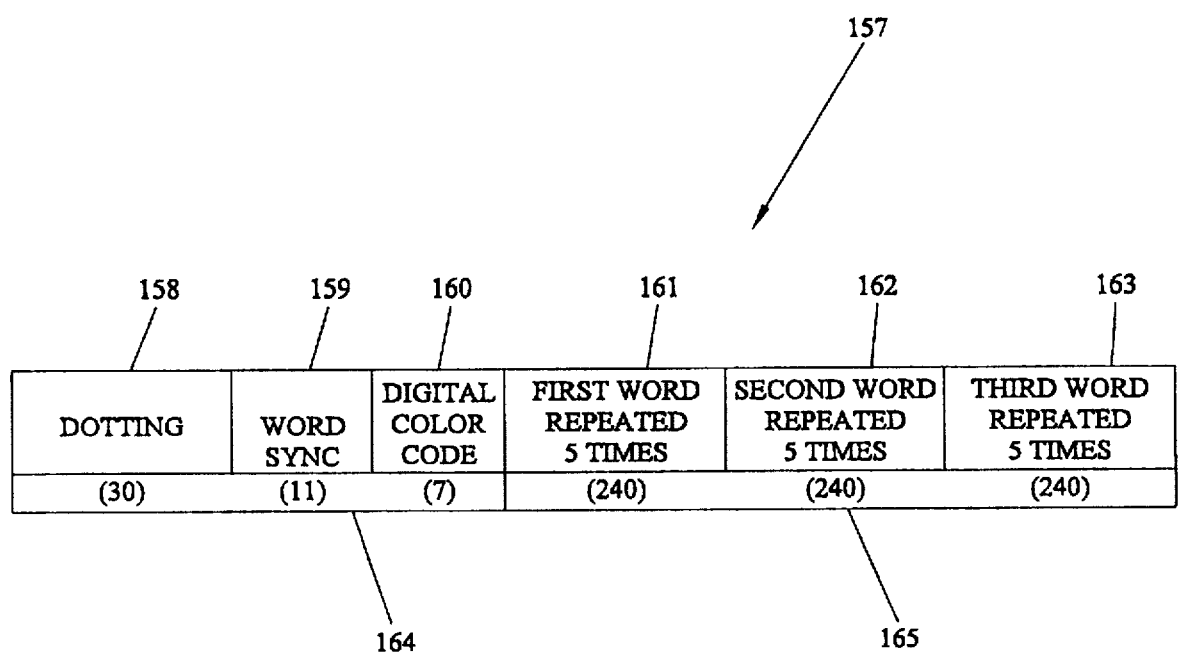
FIG. 21 contains a record format diagram showing the Advanced Mobile Phone Service (AMPS) specification structure of an reverse control channel digital communications data stream which is known as a call-origination message.

The structure of an (AMPS) specification call-origination message as pertains to the (CFDS) invention is illustrated in FIG. 21. The overall message structure consists of dotting 158, word sync 159, Digital Color Code (DCC) 160, and three words 161, 162, and 163 respectively each repeated 5 times. The length 164 of the dotting sequence is 30 bits, followed word sync of 11 bit length and (DCC) 7 bits in length. The length 165 of each call origination word 161, 162, and 163 is 240 bits.

Each of five AMPS specification call-origination message words is illustrated in FIGS. 22A-E. Such call origination words are assembled into a Manchester coded bit streams to produce a call-origination message.

Figure 22A:
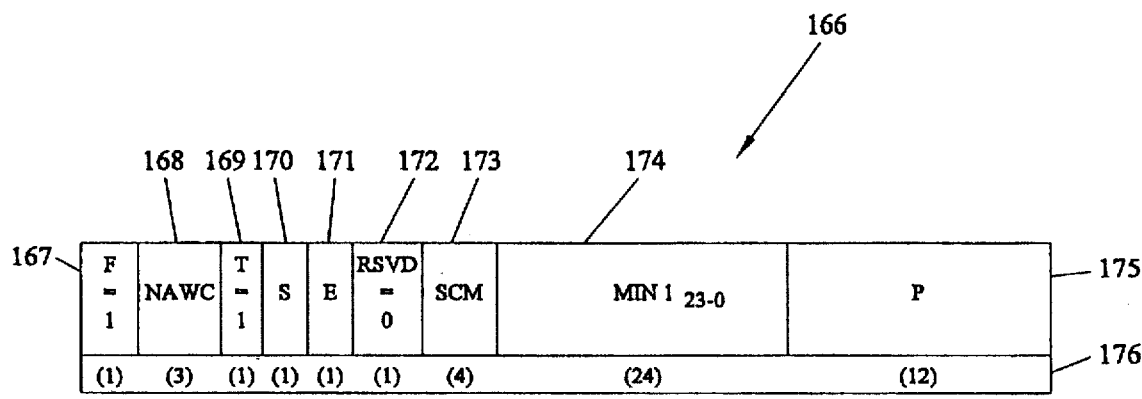
FIGS. 22A-E show record structure charts describing data word formats used within each reverse control channel data stream in which a cellular call-origination message may consist of from two to five words where all five word formats are described in detail.

Call-origination word one 166, which is an Abbreviated Address Word illustrated in FIG. 22A, consists of First Word Indication field F 167, plus Number of Additional Words Coming field NAWC 168, plus T field 169 identifying a page response, plus Send Serial Number Field S 170, plus Extended Address field E 171 a field reserved for future use RSVD 172, plus Station Class Mark field SCM 173, plus first part of Mobile Identification Number two field MIN1 174, and Parity field P 175. Bit lengths 176 corresponding to each Abbreviated Address Word are also illustrated in FIG. 22A.

Figure 22B:
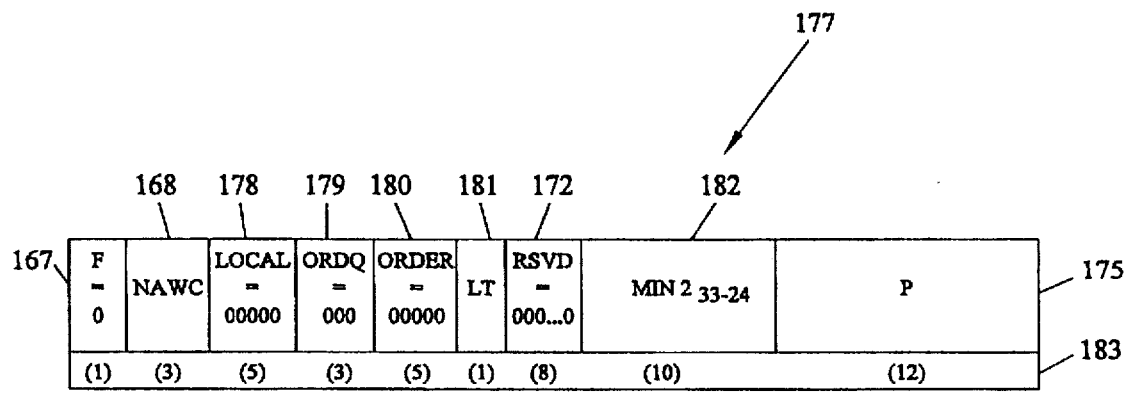
Figure 22C:
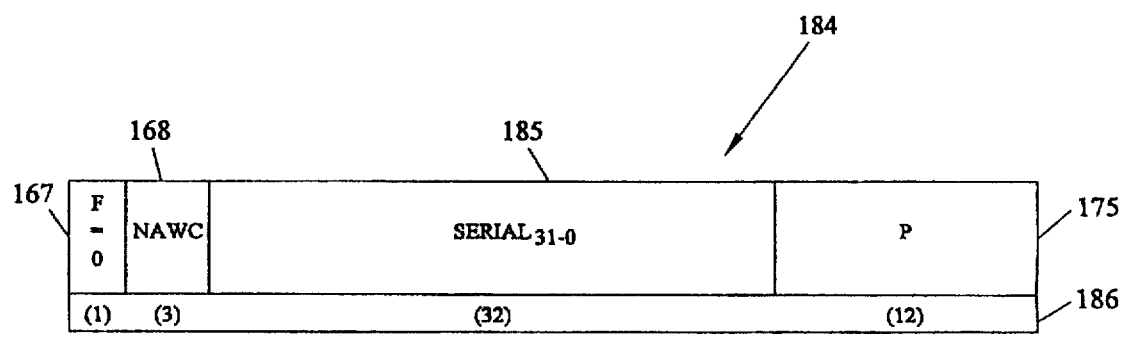

Call-origination word two 177, which is an Extended Address Word illustrated in FIG. 22B, consists of First Word Indication field F 167, plus Number of Additional Words Coming field NAWC 168, plus Local Control field LOCAL 178, plus Order Qualifter field ORDQ 179, plus Order field ORDER 180, plus Last Try Code field LT 181, plus a field reserved for future use RSVD 172, plus Mobile Identification Number two field MIN2 182, and Parity field P 175. Bit lengths 183 corresponding to each Extended Address Word are also illustrated in FIG. 22B.

Call-origination word three 103 which is a Serial Number Word illustrated in FIG. 22 C, consists of First Word Indication field F 167, plus Number of Additional Words Coming field NAWC 168, plus Serial Number field SERIAL 185, and Parity field P 175. Bit lengths 186 corresponding to each Serial Number Word are also illustrated in FIG. 22C.

Figure 22D:
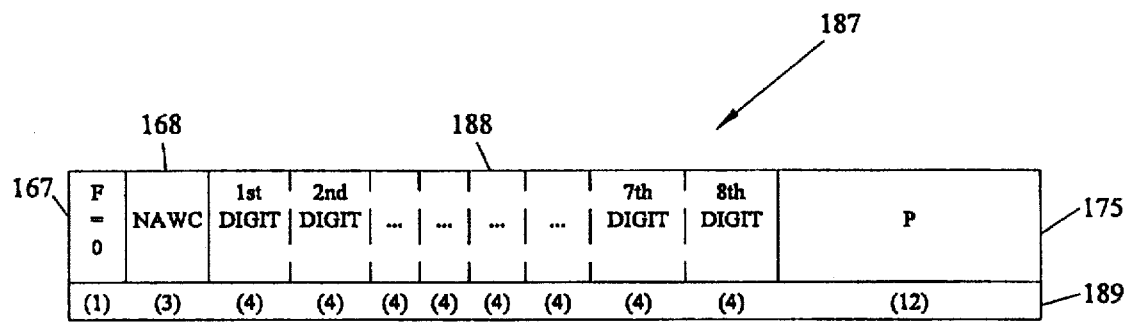
Figure 22E:
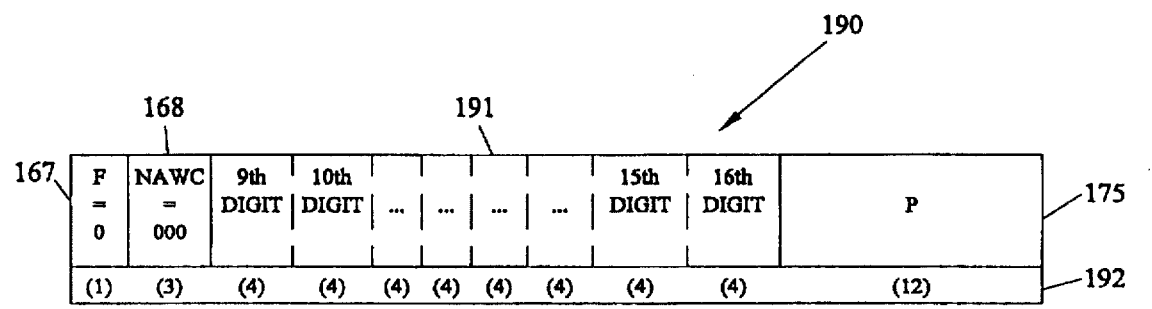

Call-origination word four 187, which is a First Word of Called-Address illustrated in FIG. 22D, consists of First Word Indication field F 167, plus Number of Additional Words Coming field NAWC 168, plus eight digits field DIGIT one to eight 188, and Parity field P 175. Bit lengths 189 corresponding to each First Word of Called-Address are also illustrated in FIG. 22D.

Call-origination word five 190, which is a Second Word of Called-Address illustrated in FIG. 22 E, consists of First Word Indication field F 167, plus Number of Additional Words Coming field NAWC 168, plus eight digits field DIGIT nine to sixteen 191, and Parity field P 175. Bit lengths 192 corresponding to each Second Word of Called-Address are also illustrated in FIG. 22 E.

Figure 23:
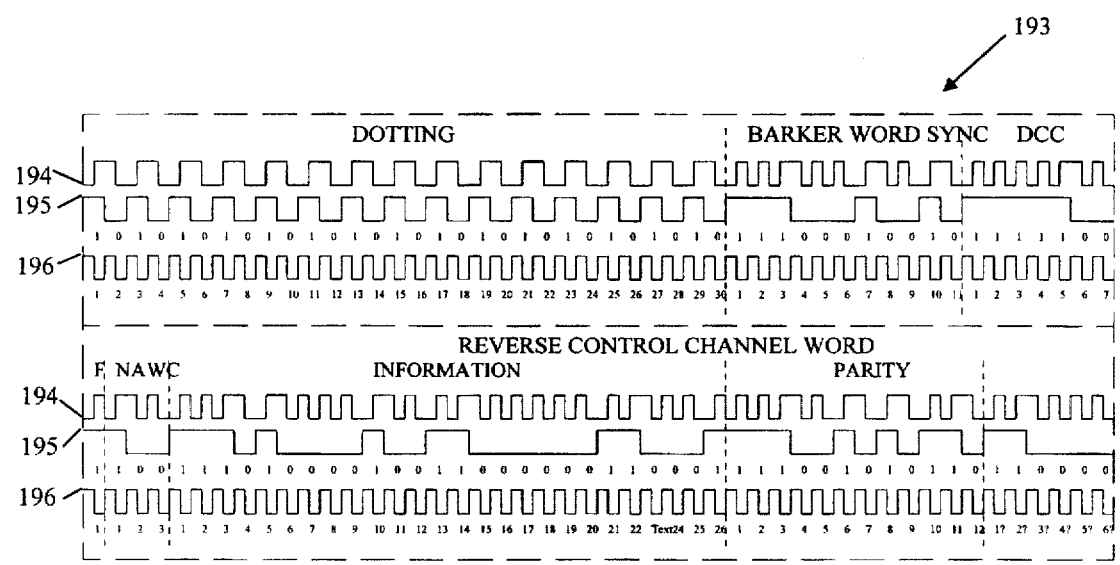
FIG. 23 illustrates an example Manchester coded data-stream as is transmitted from the Phone Interface Board sub-component of the auxiliary station (AUXS) to a cellular phone transceiver.

A representation of a time domain Manchester coded data stream 100 is illustrated in FIG. 23. A sample Manchester encoded data stream 194 is pictured showing each component of the message. Also represented is the actual state of data once Manchester decoded 195. Additionally, a clock signal 196 is pictured illustrating alignment with the Manchester coded data stream 194. The initial portion of a Manchester coded data stream consists of a preamble sequence of alternating bits referred to a dotting sequence. The dotting sequence is used to achieve receiver synchronization. Once initial synchronization is compete the data stream sequence continues with Barker word sync data. Data coding is accomplished through a Manchester decoder through first extracting clock signal 196 information from the Manchester data stream. Once the clock is extracted for use data bits are attained from the bit stream by determining the direction of transition at the center of each bit cell. If the Manchester coded signal 195 is making a rising (low-to-high) transition at the center of the bit cell then the bit is decoded as a one. If the Manchester coded signal 195 is making a falling (high-to-low) transition at the center of the bit cell then the bit is decoded as a zero.

A System for Changing (DCCs)

An additional system technique is optionally utilized to make more difficult the process of successfully capturing valid (MIN) and (ESN) call-origination parameter combinations for the purpose of fraudulent use within a geographical area in which a (CFDS) is deployed. If a reader station has the capability of displaying and reading the forward control channel (DCC) number assigned to a cell site, then is possible to relate the valid (MIN-ESN) parameter combinations transmitted by an authorized mobile station on the reverse control channel associated with that DCC. With this relationship established, a more sophisticated reader station than is now in use could have the capability of discarding the invalid (MIN-ESN) parameters combination transmitted by an auxiliary station on the reverse control channel. By dynamically and continuously altering at a frequent periodic rate call-origination (DCC) parameters within an area, or entire cell-plan system, in which (CFDS) is deployed, an added level of difficulty is created as a further deterrent to the ability to successfully capture (MIN) and (ESN) call-origination parameters in combination for purposes of fraudulent use. Concurrently, and at the same periodic rate, the non-loading (DCC) transmitted by the auxiliary station (AUXS) must be altered to a non-loading cell-site (DCC). In such a system it is necessary that a central location be responsible to command and control dynamic altering of (DCC) call-origination parameters throughout an entire cell-plan region in which a (CFDS) is deployed to prevent cell-site loading of all cells. An important concept regarding dynamic altering of call-origination parameter (DCC) is a need to keep each individual cell-site's (DCC) parameters in close (or nearly perfect time) correlation with each (DCC) used by an auxiliary station (AUXS) stationed in immediate proximity to a cell-site. Such a need to maintain a close timing relationship between each cell-site and any auxiliary station (AUXS) stationed nearby is necessary in order to prevent any possibility of undesirable cell-site loading.

Figure 24:
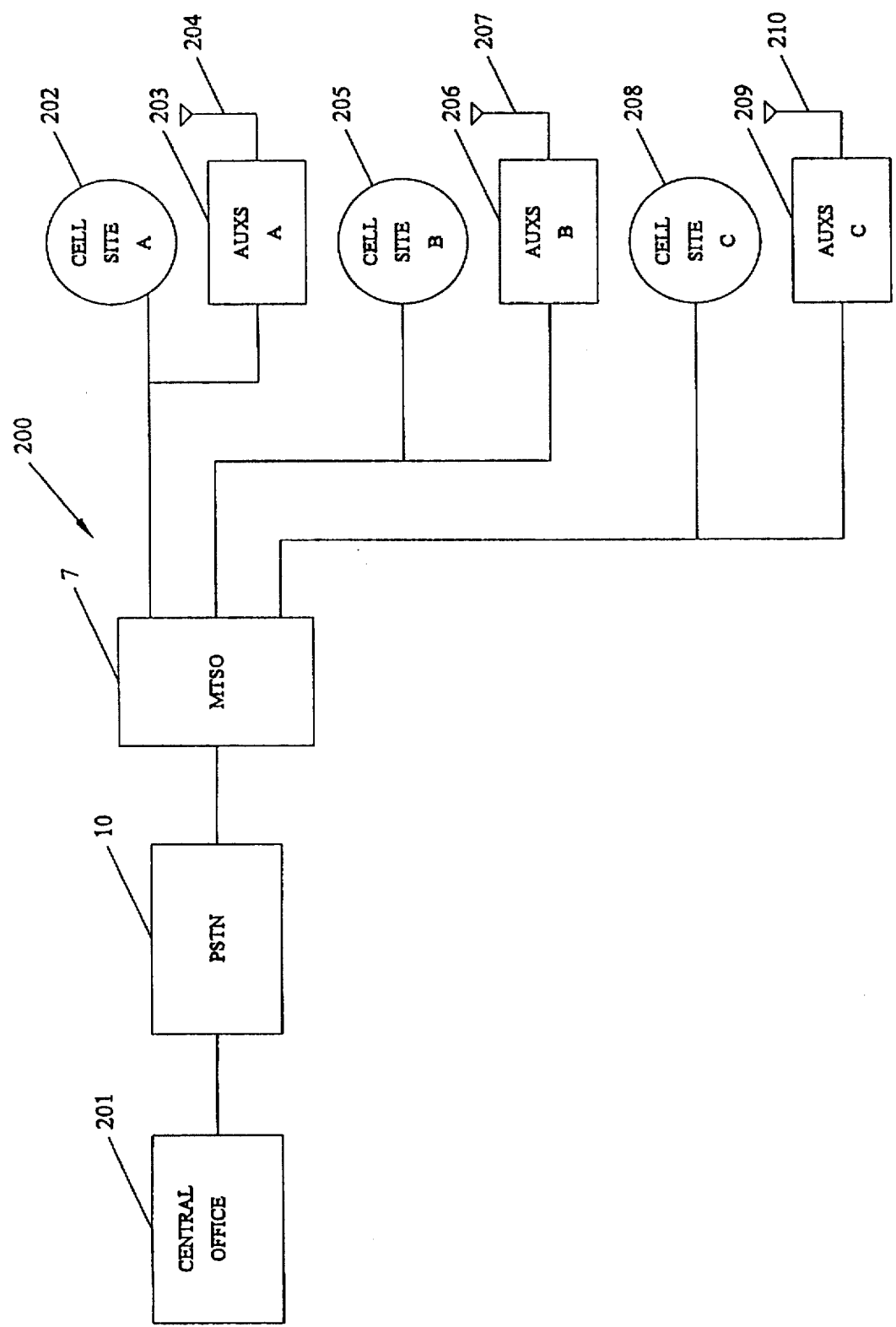
FIG. 24 shows a simplified block diagram of a cellular communications system in which dynamic Digital Color Code (DCC) alterations are implemented to make more difficult fraudulent cloning.

As shown in FIG. 24, a central office location 201 serves as the center to control dynamic cell-plan (DCC) alterations. Command messages are sent from central office location 201 through the Public Switched Telephone Network (PSTN) 10 to a Mobile Telephone Switching Office (MTSO) 7. Once a command message reaches (MTSO) 7 additional commands containing specific valid (DCC) values assigned to each cell-site are sent to each connected cell-site 202, 205 and 208 and also, at nearly the same time, inoperative each associated (AUXS) 203, 207 and 209 located in close proximity to a specific cell site. Thus, each (AUXS) uses such command from the (MTSO) to determine which invalid (DCC) is to be used when transmitting on each specific (RECC).

Figure 27:
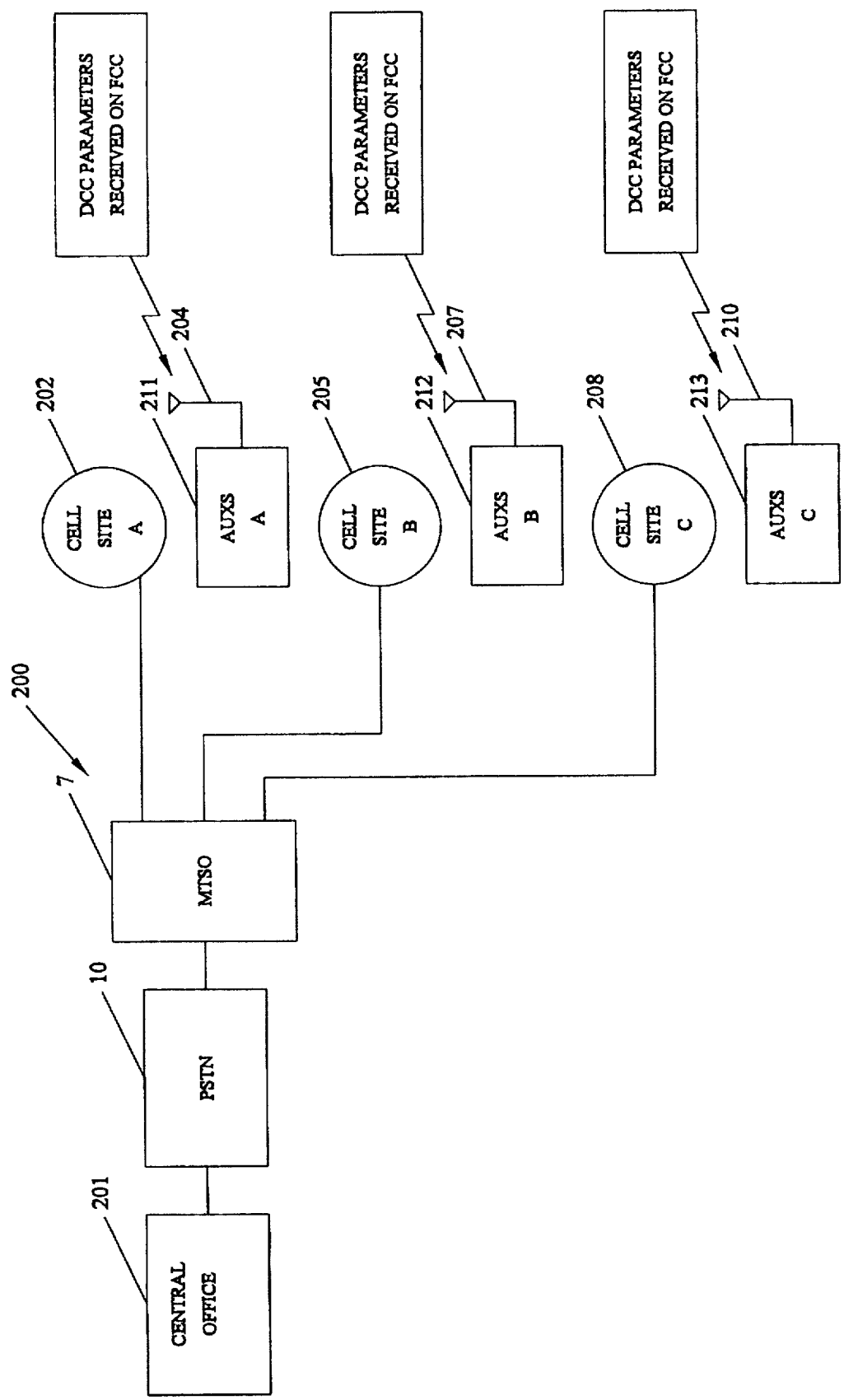
FIG. 27 shows a modification of the block diagram of FIG. 24, in which the (AUXS) stations are transceivers and the dynamic Digital Color Code (DCC) alterations are implemented by tuning the sub-component cellular phone receiver to a complementary forward control channel and thus eliminating the land-line connection.

Another approach to determine which specific dynamically allocated (DCC) parameters to use when transmitting on each specific (RECC) is to use transceivers at the (AUXS) stations (FIG. 27) (AUXS) 211, 212 and 213 are transceivers with the receiver section tuned to a complementary forward control channel (FCC) and receiving (DCC) parameters from (FCC) transmissions associated with the paired (RECCs) spaced at radio-frequency intervals of 45 MHz apart—thereby attaining the needed (DCC) information necessary to avoid undesirable cell-site loading. The land-line connections of FIG. 24 are thus eliminated.

In FIG. 24, a central office location for cellular system 200, serves as the center to control dynamic cell-plan (DCC) alterations. Command messages are sent from central office location 201 through the Public Switched Telephone Network (PSTN) 10 to a Mobile Telephone Switching Office (MTSO) 7. Once a command message reaches the (MTSO) 7 additional commands containing specific (DCC) values assigned to each cell-site are sent to each connected cell-site and also, at nearly the same time, each associated (AUXS) 13 located in close proximity.

Figure 25:
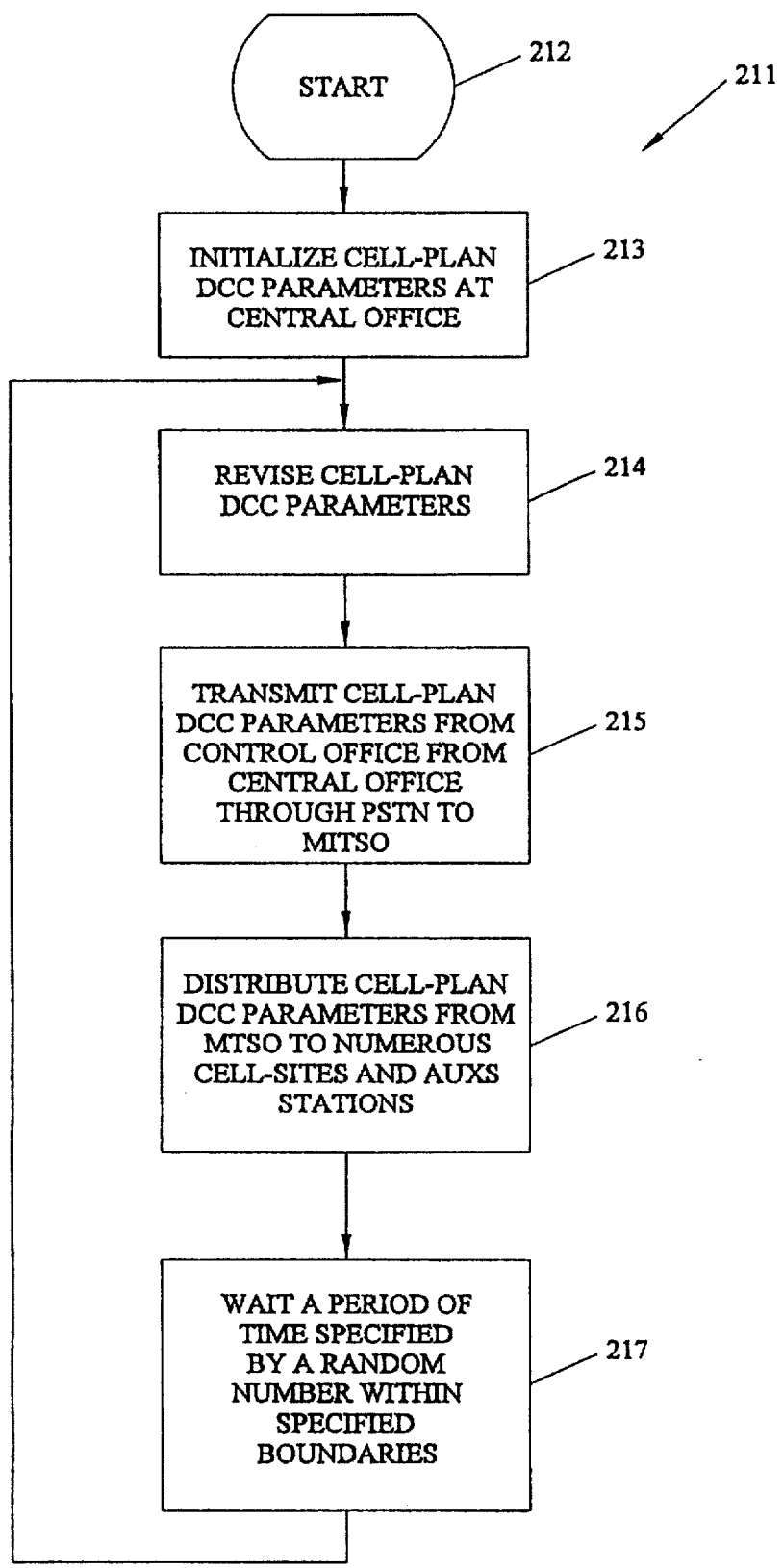
FIG. 25 shows a process flow chart illustrating an algorithm by which dynamic Digital Color Code (DCC) alterations are accomplished by the system of FIG. 24.
Figure 26:
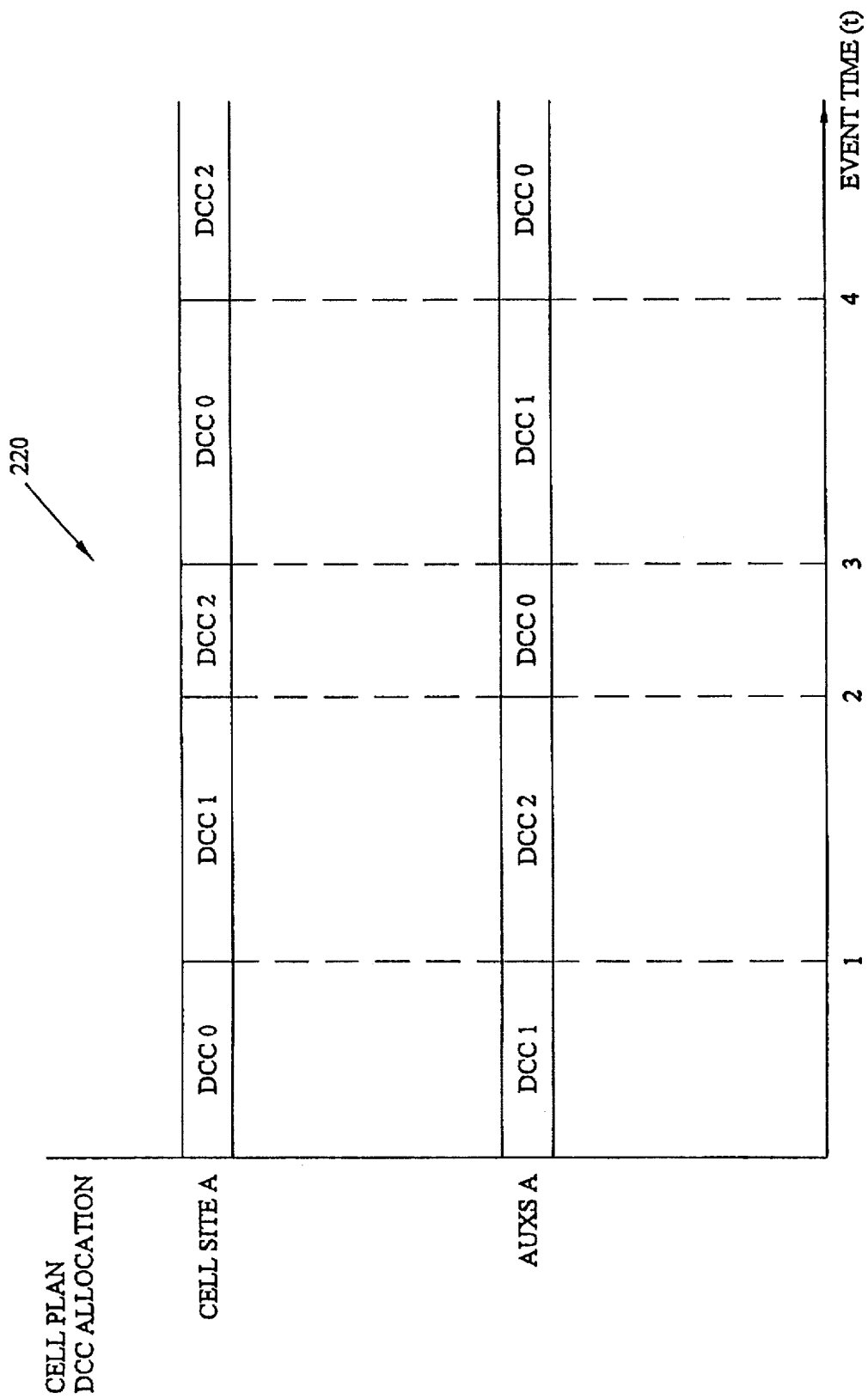
FIG. 26 shows an event timing diagram illustrating an optimum time relationship in altering the cell-plan (DCC) parameters in relationship to (AUXS) transmission (DCC) changes.

More specifically, FIG. 25 shows a block diagram of a simplified cellular communications system consisting of three cell-sites 202, 205, and 208 paired with auxiliary stations (AUXSs) 203, 206, and 209 each transmitting call origination messages from omni-directional antennas 204, 207, and 210. FIG. 26 shows a process flowchart 211 describing a method used to accomplish dynamic (DCC) alterations. First, the process begins at 212 with initialization at 213 of cell-plan (DCC) parameters at central office location 201. Next, cell-plan (DCC) parameters are altered at 214 pertaining to the entire cell-plan. Cell-plan parameters are then transmitted at 215 from central office location 201 through the Public Switched Telephone Network (PSTN) 10 to a Mobile Telephone Switching Office (MTSO) 7. Once cell-plan (DCC) parameters are present at the (MTSO) 7 it is necessary to distribute at 216 such parameters to both cell-sites 202, 205, and 208 and also (AUXSs) 202, 206, and 209. It is then necessary to wait a period of time at 217 specified by a random number within specified boundaries— generally used boundaries may be periods of time from 5 minutes to 5 hours. Once a time delay of random period expires, processing continues to loop to revise 214 cell-plan (DCC) parameters.

It is necessary to emphasize the need to synchronize timing in which (DCC) parameters are altered in time. An event timing diagram 220 is shown in FIG. 26 which indicates relative timing of cell-site A (DCC) alterations in relationship to (AUXS A) (DCC) alterations. Four events are shown as time progresses whereby (DCC) parameters are altered for both cell-site A and also (AUXS A). It is necessary to hold a timing tolerance of that does not more than 50 ms between (DCC) alteration occurrence concerning cell-site A in relation to (AUXS) A.

It should be understood that the above-described embodiments are merely illustrative of the structure and made of operation of the invention, and that changes can be made without departing from the scope of the invention.

What is claimed is:

1. A method of deterring fraudulent cloning by a reader station of valid call-origination message parameters assigned to authorized mobile radiotelephone stations operating within an area of a cellular radiotelephone system in which valid call-origination messages containing valid parameters are initiated between the mobile stations and a fixed cell-site radiotransceiver station for the area, and in which an auxiliary fraud-deterrent transmitter station transmits invalid call-origination messages containing invalid parameters within the area, comprising the steps of:

(a) establishing in the cellular radiotelephone system a database of a plurality of valid call-origination message parameters assigned to the authorized mobile stations;

(b) transmitting on a cellular channel frequency from an authorized mobile station operating in the area to the fixed cell-site station a valid call-origination message containing valid parameters;

(c) verifying in the cellular radiotelephone system that a valid call-origination message containing valid parameters has been transmitted by the mobile station; and (d) transmitting from the auxiliary fraud-deterrent station on the same cellular channel frequency invalid call-origination messages containing invalid parameters, not verifiable in the radiotelephone system, whereby the reader station receives on the same frequency both the valid and invalid call-origination messages as a commingled series.

2. The method of claim 1 in which a valid call-origination message includes a valid combination of an Electronic Serial Number (ESN) and a Mobile Identification Number (MIN) parameters which combination is included in the database of the cellular radiotelephone system and is therefore verifiable as a valid call-origination message.

3. The method of claim 2 in which an invalid call-origination message transmitted by the auxiliary fraud-deterrent transmitter station includes an invalid combination of Electronic Serial Number (ESN) and Mobile Identification Number (MIN) parameters which combination is not included in the database of the cellular radiotelephone system and therefore is not verifiable as a valid-call origination message.

4. The method of claim 3 in which each invalid call-origination message includes also a specified and predetermined invalid signal parameter which will not establish a call communications link between a mobile station and the fixed cell-site station in addition to a invalid combination of an Electronic Serial Number (ESN) and a Mobile Identification Number (MIN).

5. The method of claim 4 in which the specified and predetermined invalid signal parameter is a Digital Color Code (DCC) not assigned to the fixed cell-site station and therefore incapable of establishing a call communications link.

6. The method of claim 5 in which the invalid call-origination message transmitted by the auxiliary fraud-deterrent station includes a second invalid parameter in addition to the invalid Digital Color Code (DCC) transmitted by the auxiliary fraud-deterrent station as part of its invalid call-origination message which second invalid parameter prevents undesired loading of a second cell-site station which operates on the same channel frequency with the same Digital Color Code (DCC) as does the auxiliary fraud-deterrent station.

7. The method of claim 6 in which the second invalid parameter is selected from the group of message-class types codes utilized in the cellular radiotelephone system.

8. The method of claim 7 in which the message class type codes are the Order, Order Qualification, Local Control Codes.

9. The method of claim 8 in which the two cell-site stations are separated from one another by an intervening cell-site station located between the two cell-site stations.

10. The method of claim 2 in which each valid call-origination message includes also a specified and predetermined valid signal parameter which is required to establish a call communications link between a mobile station and the fixed cell-site station in addition to a valid combination of an Electronic Serial Number (ESN) and a Mobile Identification Number (MIN).

11. The method of claim 10 in which the specified and predetermined valid parameter is a Digital Color Code (DCC) assigned to the fixed cell-site station to establish the call communications link.

12. A method of deterring fraudulent cloning by a reader station of valid call-origination message parameters assigned to authorized mobile radiotelephone stations operating within a cell of a cellular radiotelephone system in which valid call-origination messages containing valid parameters are transmitted between the mobile radiotelephone stations and a fixed cell-site radiotransceiver station for the cell on a reverse control channel assigned to the cell, comprising the steps of:

(a) establishing in the cellular radiotelephone system a database of a plurality of valid call-origination message parameter combinations assigned to the authorized mobile stations; and (b) transmitting from an auxiliary fraud-deterrent station on the same reverse control channel a series of invalid call-origination messages containing invalid parameter combinations, not verifiable in the radiotelephone system database, whereby the reader station receives on the reverse control channel both the valid and invalid call origination messages as a comingled series.

13. The method of claim 12 in which each valid call-origination message parameter combination included in the database is a combination of an Electronic Serial Number (ESN) and a Mobile Identification Number (MIN) parameters each of which combination is assigned to an authorized mobile radiotelephone station.

14. The method of claim 13 in which each valid call-origination message includes also a Digital Color Code (DCC) assigned to the cell-site station which is required to establish a call communications link between a mobile station and the fixed cell-site station in addition to a valid combination of an Electronic Serial Number (ESN) and a Mobile Identification Number (MIN).

15. The method of claim 12 in which each invalid call-origination message parameter combination transmitted by the auxiliary fraud-deterrent transmitter station is a combination of an Electronic Serial Number (ESN) and a Mobile Identification Number (MIN) parameters which combination is not included in the database of the cellular radiotelephone system and therefore is not verifiable as a valid call origination message.

16. The method of claim 15 in which each invalid call-origination message includes also a Digital Color Code (DCC) not assigned to the cell-site radiotransceiver station which will not establish a call communications link between the auxiliary fraud-deterrent transmitter station and the cell-site radiotransceiver station.

17. The method of claim 16 in which each invalid call-origination message transmitted by the auxiliary fraud-deterrent station includes a second invalid parameter in addition to the Digital Color Code (DCC) transmitted by the auxiliary fraud-deterrent station as part of its invalid call-origination messages to prevent undesired loading of a second cell-site station which operates on the same reverse control channel with the same Digital Color Code (DCC) as does the auxiliary fraud-deterrent station.

18. The method of claim 17 in which the second invalid parameter is selected from the group of message-class types codes utilized in the cellular radiotelephone system.

19. The method of claim 18 in which the message-class type codes are the Order, Order Qualification, Local Control Codes.

20. The method of claim 19 in which the two cell-site stations are separated from one another by an intervening cell-site station located between the two cell-site stations.

21. A method of deterring fraudulent cloning by a reader station of valid call-origination message parameters assigned to authorized mobile radiotelephone stations operating within an area of a cellular radiotelephone system which has been subdivided into a plurality of contiguous sectors and in which valid call-origination messages containing valid parameter combinations are initiated between the mobile stations and a fixed cell-site radiotransceiver station for the area, and in which the radiotransciever station includes a directional radiotransceiver face for each sector with each face being assigned a different cellular reverse control channel (RECC) and a different Digital Color Code (DCC) than that assigned to the other faces, comprising the steps of:

(a) establishing in the cellular radiotelephone system a database containing a plurality of valid call-origination message parameter combinations assigned to the authorized mobile stations;

(b) transmitting on the reverse control channel assigned to each sector from an authorized mobile station operating in that sector to the fixed cell-site station face for that sector a valid call-origination message containing a valid parameter combination;

(c) verifying in the cellular radiotelephone system that a valid call-origination message containing a valid parameter combination has been transmitted by the mobile station; and (d) transmitting from an auxiliary fraud-deterrent station sequentially on each reverse control channel (RECC) assigned to each sector and using a different Digital Color Code (DCC) than that assigned to that sector invalid call-origination messages containing invalid parameter combinations, not verifiable in the radiotelephone system, whereby the reader station receives both the valid and invalid call-origination messages as a commingled series for all sectors.

22. The method of claim 21 in which a valid call-origination message includes a combination of an Electronic Serial Number (ESN) and a Mobile Identification Number (MIN) parameters which combination is included in the database of the cellular radiotelephone system and is therefore verifiable as valid call origination message.

23. The method of claim 21 in which each invalid call-origination message transmitted by the auxiliary fraud-deterrent transmitter station includes a combination of an Electronic Serial Number (ESN) and a Mobile Identification Number (MIN) parameters which combination is not included in the database of the cellular radiotelephone system and therefore is not verifiable as a valid call origination message.

24. The method of claim 23 in which each invalid call-origination message transmitted by the auxiliary fraud-deterrent station includes a second invalid parameter in addition to the Digital Color Code (DCC) transmitted by the auxiliary fraud-deterrent station as part of its invalid call-origination messages to prevent undesired loading of a second cell-site station which operates on the same reverse control channel (RECC) with the same Digital Color Code (DCC) as does the auxiliary fraud-deterrent station.

25. The method of claim 24 in which the second invalid parameter is selected from the group of message-class types codes utilized in the cellular radiotelephone system.

26. The method of claim 25 in which the message class type codes are the Order, Order Qualification, and Local Control Codes.

27. The method of claim 26 in which the two cell-site stations are separated from one another by an intervening cell-site station located between the two cell-site stations.

28. A method of deterring fraudulent cloning by a reader station of valid call-origination message parameters assigned to authorized mobile radiotelephone stations operating within a cell of a cellular radiotelephone system in which valid call-origination messages containing valid parameters are initiated between the mobile stations and a fixed cell-site radiotransceiver station for the cell on a reverse control channel (RECC) and utilizing a Digital Color Code (DCC) assigned to the cell-site station, and in which an auxiliary fraud-deterrent transmitter station transmits invalid call origination messages containing invalid parameters within the cell, comprising the steps of:

(a) establishing in the cellular radiotelephone system a database of a plurality of valid call-origination message parameters assigned to the authorized mobile stations;

(b) transmitting on the reverse control channel (RECC) assigned to the cell-site station from an authorized mobile station operating in the cell to the cell-site station a valid call-origination message containing valid parameters;

(c) verifying in the cellular radiotelephone system that a valid call-origination message containing valid parameters has been transmitted by the mobile station;

(d) transmitting from the auxiliary fraud-deterrent station on the same reverse control channel (RECC) assigned to the cell-site station with a different Digital Color Code (DCC) than that assigned to the cell-site station invalid call-origination messages containing invalid parameters, not verifiable in the radiotelephone system, whereby the reader station receives both the valid and invalid call origination messages as a commingled series; and (e) periodically changing the Digital Color Code (DCC) assigned to the cell-site station and at substantially the same time changing the Digital Color Coded (DCC) utilized by the auxiliary fraud deterrent station to one that is different from the changed Digital Color Code (DCC) utilized in the current transmissions from the cell-site station.

29. The method of claim 28 in which a valid call-origination message includes a combination of an Electronic Serial Number (ESN) and a Mobile Identification Number (MIN) parameters which combination is included in the database of the cellular radiotelephone system and is therefore verifiable as valid call origination message.

30. The method of claim 28 in which an invalid call-origination message transmitted by the auxiliary fraud-deterrent transmitter station includes a combination of an Electronic Serial Number (ESN) and a Mobile Identification Number (MIN) parameters which combination is not included in the database of the cellular radiotelephone system and therefore is not verifiable as a valid call origination message.

31. An auxiliary fraud-deterrent transmitter station for deterring fraudulent cloning by a reader station of valid call-origination message parameters assigned to authorized mobile radiotelephone stations operating within an area of a cellular radiotelephone system in which valid call-origination messages containing valid parameters are initiated between the mobile stations and a fixed cell-site radiotransceiver station for the area on a duplex control channel consisting of a forward control channel (FCC) and a reverse control (RECC) using a Digital Color Code (DCC) comprising:

(a) an omnidirectional antenna;

(b) a radiotelephone transmitter connected to the omnidirectional antenna to transmit signals on a cellular reverse control channel (RECC) frequency assigned to the cell-site radiotransceiver station using a Digital Color Code (DCC) not assigned to the cell-site radiotransceiver station; and (c) means for inputting invalid call-origination (MIN-ESN) parameter combinations to the radiotelephone transmitter for transmission on the reverse control channel (RECC).

32. The auxiliary fraud deterrent station of claim 31 including means for periodically changing the Digital Color Code (DCC) of the auxiliary fraud deterrent station to a (DCC) number inoperable to establish communications with and loading of the cell-site radiotransceiver station at substantially the same time as periodic Digital Color Code (DCC) changes are effected at the cell-site radiotransceiver station.

* * * * *